United States Patent
Fox et al.

(10) Patent No.: US 11,466,764 B1
(45) Date of Patent: *Oct. 11, 2022

(54) VEHICLE HAVING ELECTRIC ACTUATOR

(71) Applicant: Hydro-Gear Limited Partnership, Sullivan, IL (US)

(72) Inventors: Ivan E. Fox, Mattoon, IL (US); Austin J. Templin, Pittsboro, IN (US); Jesse L. Probst, Strasburg, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,607

(22) Filed: Mar. 9, 2020

Related U.S. Application Data

(63) Continuation of application No. 15/707,564, filed on Sep. 18, 2017, now Pat. No. 10,584,780, which is a
(Continued)

(51) Int. Cl.
*F16H 39/02* (2006.01)
*B60W 10/10* (2012.01)
(Continued)

(52) U.S. Cl.
CPC .............. *F16H 39/02* (2013.01); *B60W 10/08* (2013.01); *B60W 10/10* (2013.01); *B62D 11/003* (2013.01); *F16H 1/203* (2013.01); *F16H 19/08* (2013.01); *F16H 35/10* (2013.01); *F16H 61/435* (2013.01); *H02K 5/225* (2013.01); *H02K 7/108* (2013.01); *H02K 7/116* (2013.01); *H02K 7/1166* (2013.01); *B60W 10/02* (2013.01);
(Continued)

(58) Field of Classification Search
None
See application file for complete search history.

(56) References Cited

U.S. PATENT DOCUMENTS

| | | |
|---|---|---|
| 1,418,325 A | 6/1922 | Patterson |
| 2,142,171 A | 1/1939 | Boston |

(Continued)

FOREIGN PATENT DOCUMENTS

| | | |
|---|---|---|
| EP | 0271744 A2 | 6/1988 |
| EP | 2236825 A2 | 10/2010 |

(Continued)

OTHER PUBLICATIONS

Fu, et al., "A Novel Electrical Servo Variable Displacement Hydraulic Pump Used for Integrated Actuator in MEA," 28th International Congress of The Aeronautical Sciences, 2012.
(Continued)

*Primary Examiner* — Timothy Hannon
(74) *Attorney, Agent, or Firm* — Neal, Gerber & Eisenberg LLP

(57) ABSTRACT

A vehicle having a pair of electric actuators for use with a pair of drive apparatuses is disclosed herein. For each actuator, an electric motor drives a reduction gear train to position a control shaft, the reduction gear train having a worm drive that motivates a spur gear reduction. The housing of the electric actuator features a motor chamber to accommodate the electric motor and is sealed by a cap having an electric connector.

12 Claims, 22 Drawing Sheets

Related U.S. Application Data continuation of application No. 14/833,595, filed on Aug. 24, 2015, now Pat. No. 9,765,870, which is a continuation of application No. 14/104,979, filed on Dec. 12, 2013, now Pat. No. 9,114,798.

(60) Provisional application No. 61/782,218, filed on Mar. 14, 2013, provisional application No. 61/736,115, filed on Dec. 12, 2012.

(51) Int. Cl.

| | | |
|---|---|---|
| *H02K 5/22* | (2006.01) | |
| *H02K 7/108* | (2006.01) | |
| *H02K 7/116* | (2006.01) | |
| *B62D 11/00* | (2006.01) | |
| *F16H 1/20* | (2006.01) | |
| *F16H 19/08* | (2006.01) | |
| *F16H 35/10* | (2006.01) | |
| *F16H 61/435* | (2010.01) | |
| *B60W 10/08* | (2006.01) | |
| *F16D 43/202* | (2006.01) | |
| *F16D 7/04* | (2006.01) | |
| *B60W 10/02* | (2006.01) | |
| *F16D 11/10* | (2006.01) | |

(52) U.S. Cl.
CPC ............. *F16D 7/046* (2013.01); *F16D 11/10* (2013.01); *F16D 43/202* (2013.01); *F16D 43/2022* (2013.01); *F16D 43/2026* (2013.01)

(56) References Cited

U.S. PATENT DOCUMENTS

| | | |
|---|---|---|
| 3,054,310 A | 9/1962 | Varner |
| 3,646,754 A | 3/1972 | Koch et al. |
| 3,733,970 A | 5/1973 | Bosch |
| 4,616,164 A | 10/1986 | Kenny et al. |
| 4,624,175 A | 11/1986 | Wahlmark |
| 4,688,420 A | 8/1987 | Minagawa |
| 4,808,934 A | 2/1989 | Yokoyama et al. |
| 4,827,721 A | 5/1989 | Hayashi et al. |
| 4,854,125 A | 8/1989 | Inoue |
| 4,875,390 A | 10/1989 | Hayashi et al. |
| 4,916,901 A | 4/1990 | Hayashi et al. |
| 4,951,469 A | 8/1990 | Hayashi et al. |
| 4,967,556 A | 11/1990 | Inoue |
| 4,984,161 A | 1/1991 | Nakazawa et al. |
| 4,991,492 A | 2/1991 | Bratt et al. |
| RE34,064 E | 9/1992 | Tury et al. |
| 5,216,305 A | 6/1993 | Strobl |
| 5,363,713 A | 11/1994 | Pearson |
| 5,584,214 A | 12/1996 | Hayashi et al. |
| 5,983,743 A | 11/1999 | McGregor et al. |
| 6,091,171 A * | 7/2000 | Ohishi .................. H02K 5/225 310/68 B |
| 6,122,996 A | 9/2000 | Hauser et al. |
| 6,138,069 A | 10/2000 | Ellertson et al. |
| 6,176,684 B1 | 1/2001 | Zimmermann |
| 6,229,226 B1 | 5/2001 | Kramer et al. |
| 6,229,233 B1 | 5/2001 | Torii et al. |
| 6,332,393 B1 | 12/2001 | Trimble |
| 6,343,470 B1 | 2/2002 | Nanri et al. |
| 6,481,203 B1 | 11/2002 | Johnson et al. |
| 6,487,857 B1 | 12/2002 | Poplawski et al. |
| 6,494,686 B1 | 12/2002 | Ward |
| 6,707,188 B2 | 3/2004 | Torii et al. |
| 6,759,783 B2 | 7/2004 | Hager et al. |
| 6,775,976 B1 | 8/2004 | Phanco et al. |
| 6,921,994 B2 | 7/2005 | Kawakami et al. |
| 6,951,164 B2 | 10/2005 | Ito et al. |
| 6,955,046 B1 | 10/2005 | Holder et al. |
| 6,971,942 B2 | 12/2005 | Baker et al. |
| 7,055,795 B2 | 6/2006 | Lay |
| 7,061,150 B2 | 6/2006 | Sesselmann |
| 7,062,909 B2 | 6/2006 | Ito et al. |
| 7,070,117 B2 | 7/2006 | Kook |
| 7,076,948 B2 | 7/2006 | Ito et al. |
| 7,134,276 B1 | 11/2006 | Langenfeld et al. |
| 7,152,403 B2 | 12/2006 | Yoshida |
| 7,247,004 B2 | 7/2007 | Suganami et al. |
| 7,281,375 B1 | 10/2007 | Holder et al. |
| 7,337,758 B2 | 3/2008 | Sturdy et al. |
| 7,464,620 B2 | 12/2008 | Li et al. |
| 7,503,173 B2 | 3/2009 | Dong et al. |
| 7,506,729 B2 | 3/2009 | Smith et al. |
| 7,658,239 B2 | 2/2010 | Klemm et al. |
| 7,728,472 B2 | 6/2010 | Huck et al. |
| 8,074,451 B2 | 12/2011 | Kuras et al. |
| 8,250,862 B1 | 8/2012 | Iida et al. |
| 8,302,755 B2 | 11/2012 | Hayakawa et al. |
| 8,490,722 B2 | 7/2013 | Koga et al. |
| 8,511,216 B2 | 8/2013 | Sasahara et al. |
| 8,587,170 B2 | 11/2013 | Caliendo et al. |
| 8,844,658 B2 | 9/2014 | Wyatt et al. |
| 9,067,574 B2 | 6/2015 | Nishikawa et al. |
| 9,080,670 B2 | 7/2015 | Komatsu et al. |
| 9,114,798 B1 | 8/2015 | Fox et al. |
| 9,234,582 B2 | 1/2016 | Smith |
| 2003/0173954 A1 | 9/2003 | Terui et al. |
| 2004/0103733 A1 | 6/2004 | Sumita et al. |
| 2004/0129252 A1 | 7/2004 | Wayama et al. |
| 2005/0139024 A1 | 6/2005 | Chen |
| 2005/0223832 A1 | 10/2005 | Li et al. |
| 2006/0272495 A1 | 12/2006 | Ohashi |
| 2008/0018269 A1 * | 1/2008 | Wyatt .................. B62D 5/0418 318/53 |
| 2009/0044506 A1 * | 2/2009 | Nunez .................... A01D 34/64 56/11.3 |
| 2009/0295258 A1 | 12/2009 | Caliendo et al. |
| 2010/0199656 A1 | 8/2010 | Ohashi |
| 2012/0198994 A1 | 8/2012 | Choi |
| 2014/0239780 A1 | 8/2014 | Tanaka et al. |
| 2014/0361667 A1 | 12/2014 | Bui |

FOREIGN PATENT DOCUMENTS

| | | |
|---|---|---|
| GB | 1600699 A | 10/1981 |
| JP | 2001349427 A | 12/2001 |
| JP | 2004141049 A | 5/2004 |
| JP | 2007092909 A | 4/2007 |
| JP | 2008055965 A | 3/2008 |

OTHER PUBLICATIONS

U.S. Appl. No. 15/707,564, filed Sep. 18, 2017.
U.S. Appl. No. 14/833,595, filed Aug. 24, 2015.
U.S. Appl. No. 14/104,979, filed Dec. 12, 2013.

* cited by examiner

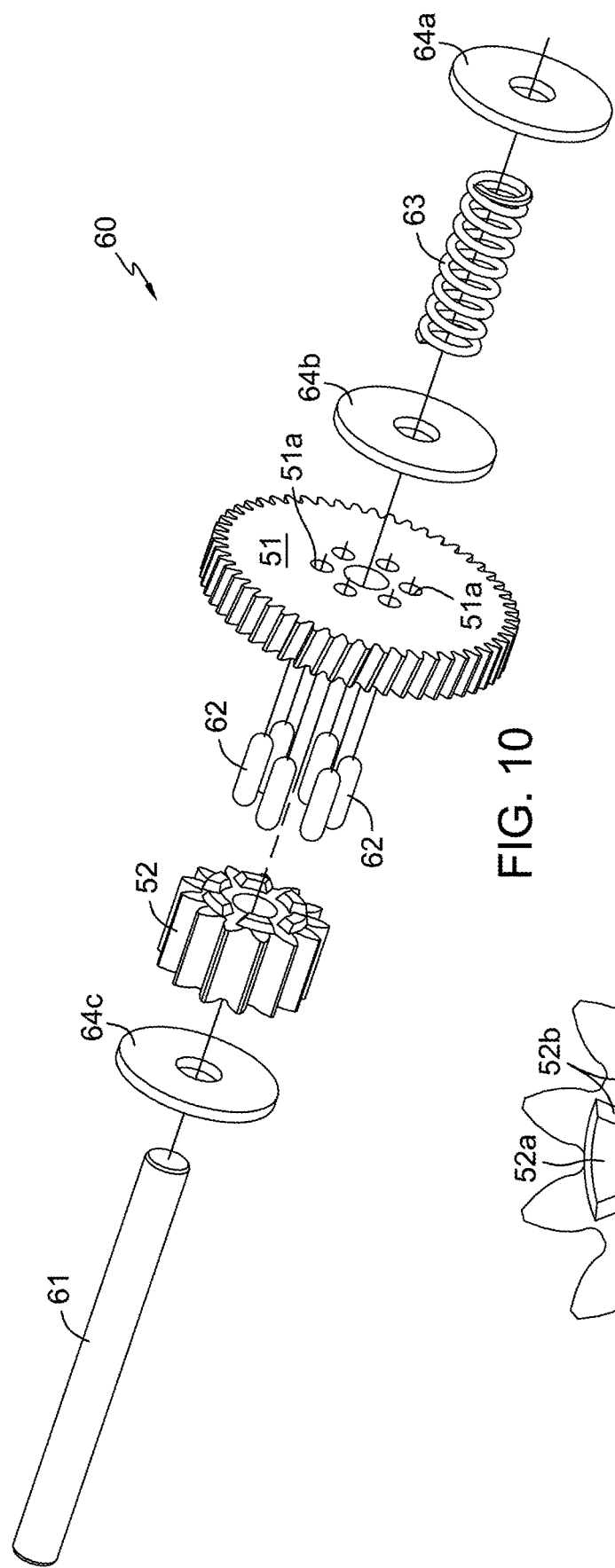
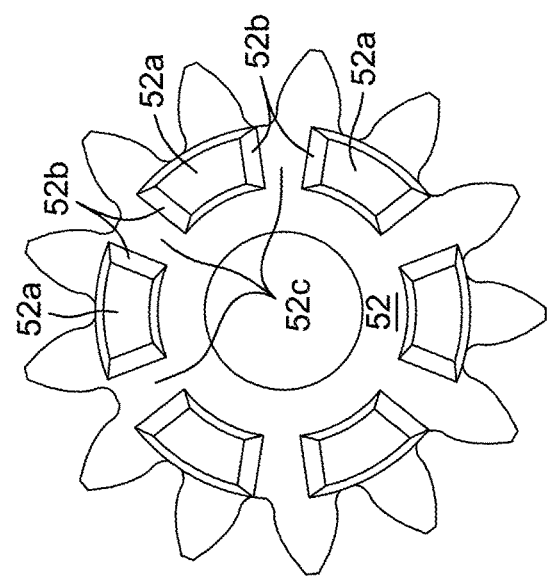

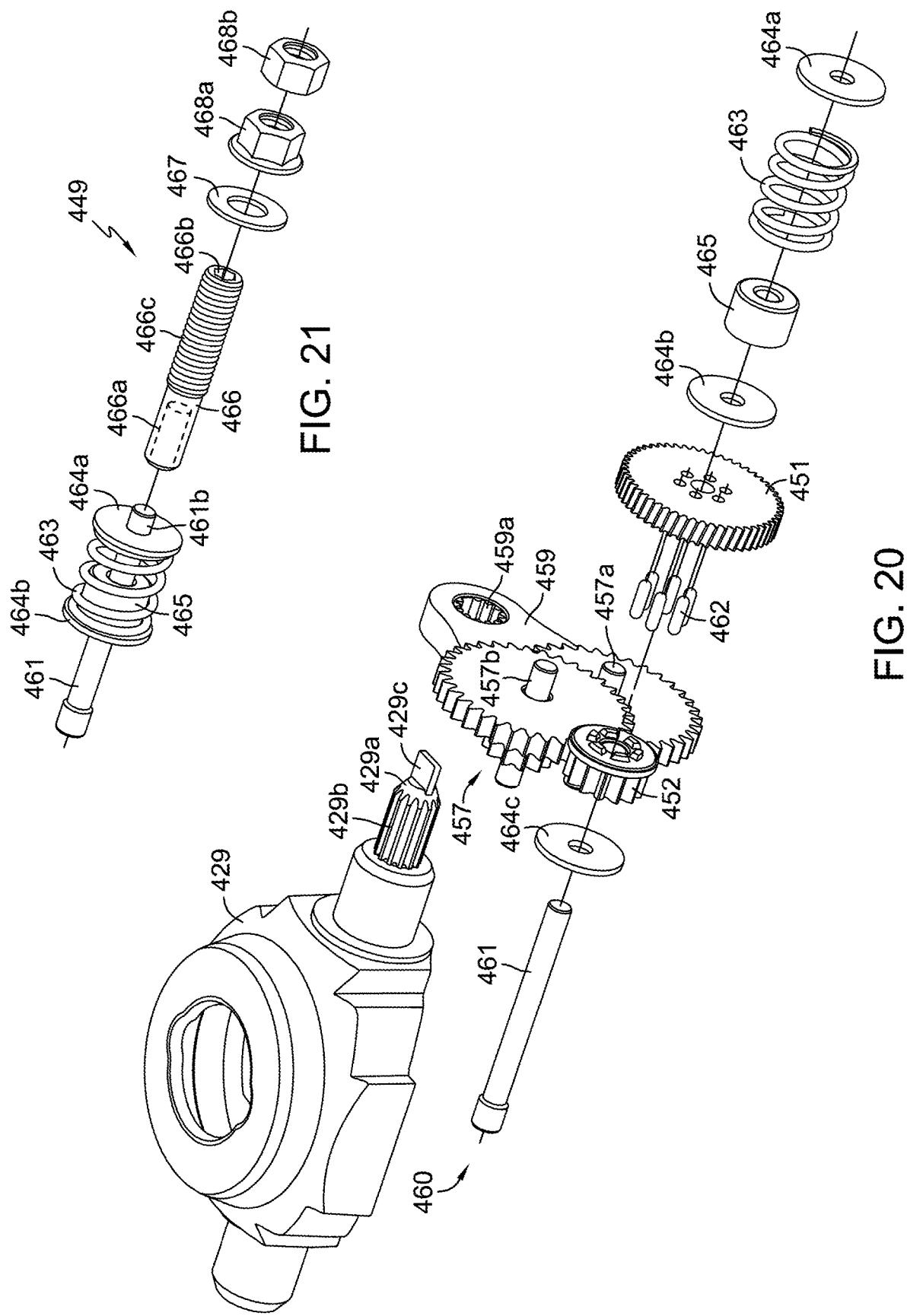

VEHICLE HAVING ELECTRIC ACTUATOR

CROSS-REFERENCE

This application is a continuation of U.S. patent application Ser. No. 15/707,564, filed on Sep. 18, 2017, which is a continuation of U.S. patent application Ser. No. 14/833,595, filed on Aug. 24, 2015, now U.S. Pat. No. 9,765,870, which is a continuation of U.S. patent application Ser. No. 14/104,979, filed on Dec. 12, 2013, now U.S. Pat. No. 9,114,798, which claims the benefit of U.S. Provisional App. No. 61/736,115, filed on Dec. 12, 2012, and U.S. Provisional App. No. 61/782,218, filed on Mar. 14, 2013. The contents of these prior applications are incorporated herein by reference in their entirety.

BACKGROUND OF THE INVENTION

This application relates to an electric actuator for a drive apparatus generally, and in particular to an electric actuator for a drive apparatus having a rotatable control shaft, the combination intended for use in a vehicle or other mobile power equipment.

SUMMARY OF THE INVENTION

An electric actuator for use with a drive apparatus is disclosed herein. The electric actuator has a rotary design incorporating a position sensor disposed to engage the end of a control shaft. An electric motor drives a reduction gear train to position the control shaft, the reduction gear train having a worm drive that motivates a spur gear reduction. A slip clutch may be disposed between the worm drive and spur gear reduction to protect the components of the reduction gear train, and to also place a limit on the torque applied to the control shaft. The housing of the electric actuator features a motor chamber to accommodate the electric motor and is sealed by a cap having an electric connector. In certain applications, such as in use with a transaxle, the actuator housing may be integrated with the transaxle housing such that the gearing for the actuator and the hydraulic components of the pump or transaxle may share oil, to minimize the need for separate housing elements The foregoing summary is exemplary of the description only, and a better understanding of the objects, advantages, features, properties and relationships of the inventions will be obtained from the following detailed description and accompanying drawings which set forth illustrative embodiments that are indicative of the various ways in which the principles of the inventions may be employed.

BRIEF DESCRIPTION OF THE DRAWINGS

FIG. 10 is an exploded view of the clutch assembly shown in FIG. 8.

FIG. 11 is a plan view of a reduction gear adapted to serve as a component of the clutch assembly shown in FIG. 10.

FIG. 20 is an exploded perspective view of certain operative components of the swash plate of the transaxle and the electric actuator of FIG. 16.

FIG. 21 is an exploded perspective view of certain components of a modified clutch assembly for the electric actuator, including a clutch spring compression adjustment mechanism.

DETAILED DESCRIPTION OF THE DRAWINGS

Figure 1:
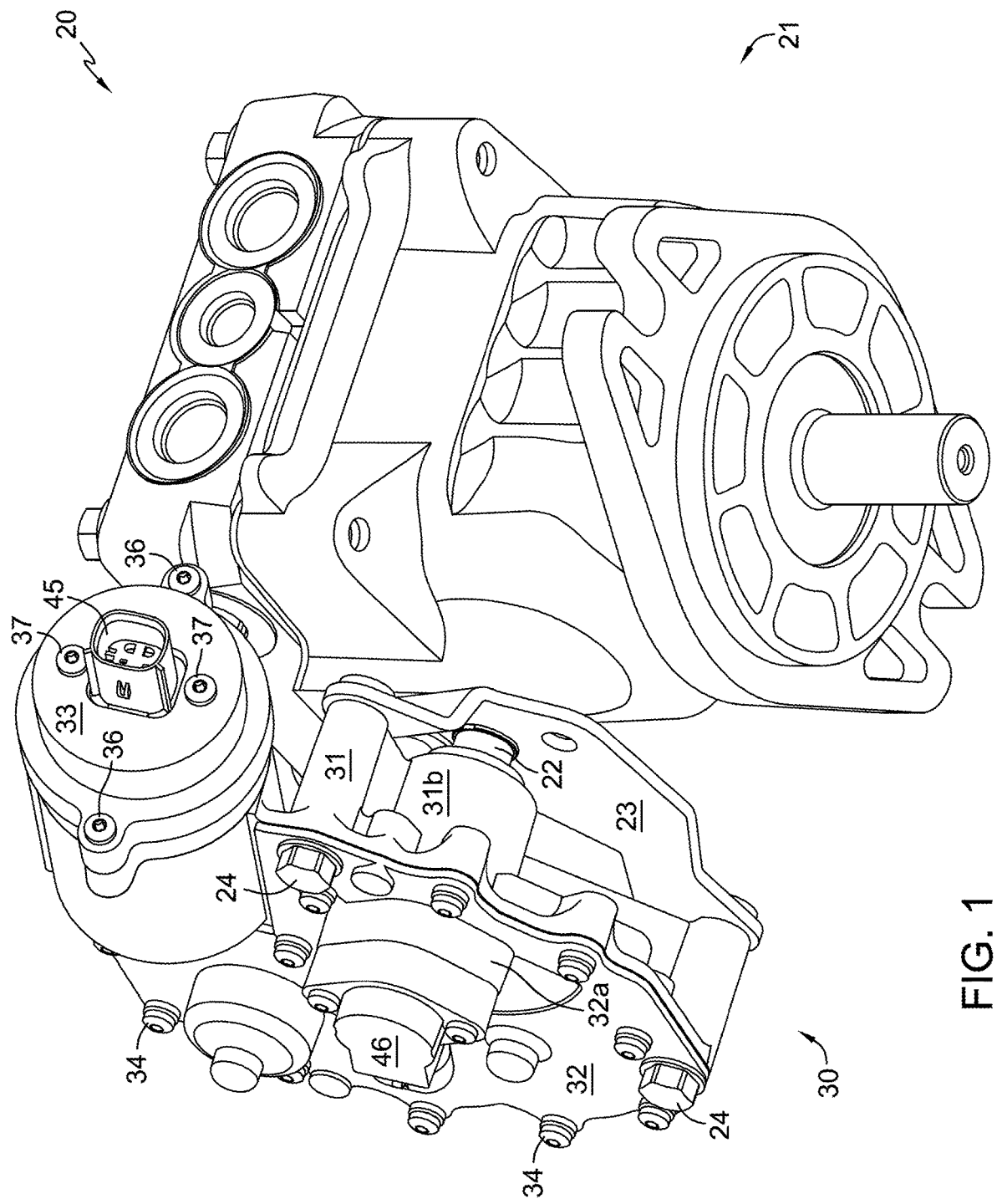
FIG. 1 is a perspective view of an embodiment of an electric actuator applied to a pump forming a representative drive assembly.

The description that follows describes, illustrates and exemplifies one or more embodiments of the invention in accordance with its principles. This description is not provided to limit the inventions to the embodiment(s) described herein, but rather to explain and teach the principles of the inventions in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers using different prefixes in cases where such labeling facilitates a more clear description or understanding. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 2:
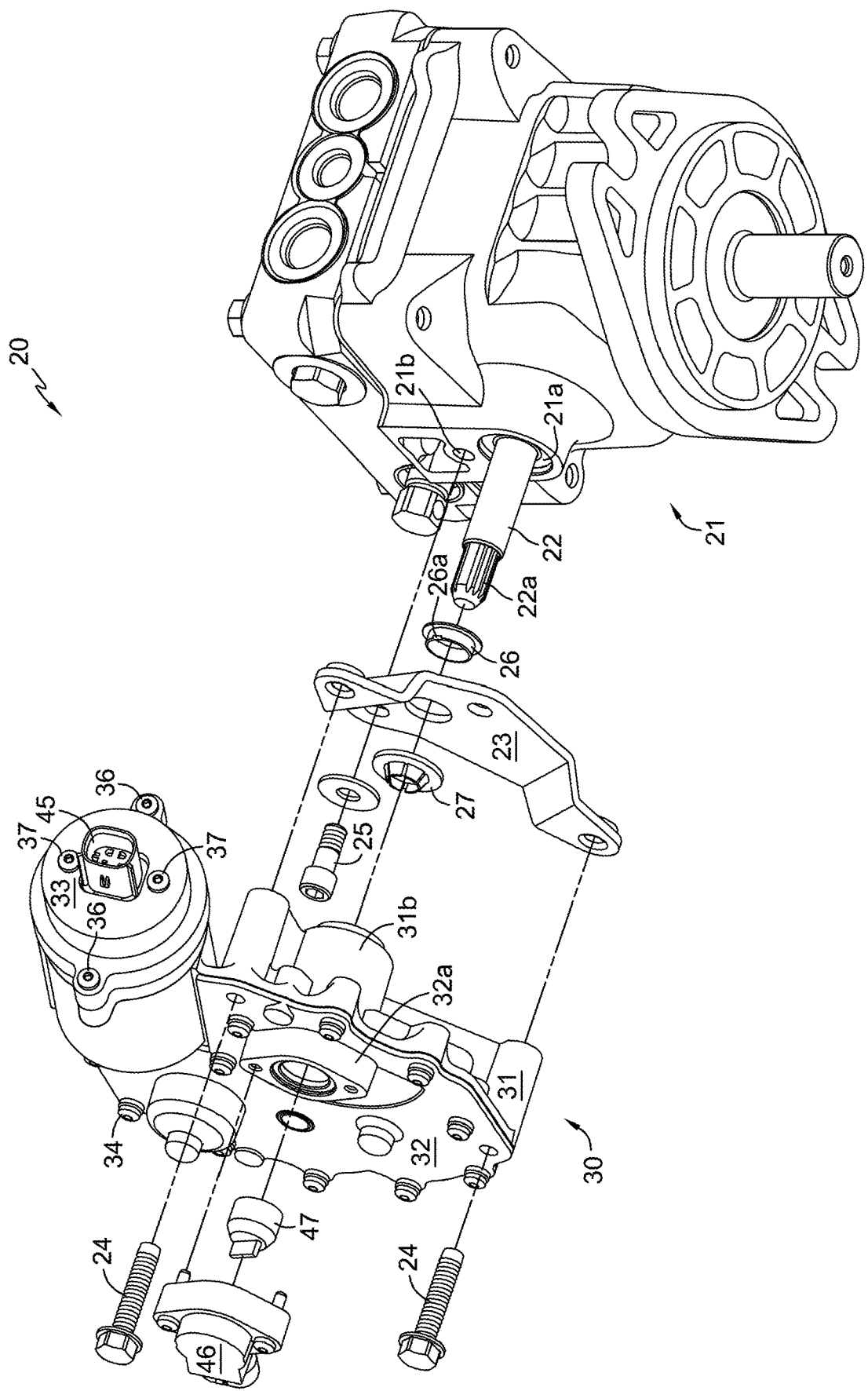
FIG. 2 is a partially exploded view of the assembly shown in FIG. 1.

FIGS. 1 and 2 depict an electric actuator 30 applied to a representative drive apparatus, namely a variable displacement pump 21, to form a drive assembly 20. While variable displacement pump 21 is illustrated as an axial piston pump of the type disclosed in commonly-owned U.S. Pat. No. 6,332,393, it is to be understood that electric actuator 30 may be applied to actuate any drive apparatus having a rotatable control shaft, e.g. hydrostatic transmissions or transaxles of the types illustrated in commonly-owned U.S. Pat. Nos. 6,122,996 and 6,775,976. All commonly-owned patents cited within this specification are incorporated by reference herein. Application of the electric actuator to other types of variable drive apparatuses having rotatable control shafts, such as toroidal, friction and mechanical drives, is also contemplated within the scope of the inventions described herein. As will be described later herein, a drive assembly such as drive assembly 20 is useful in powering a vehicle or other mobile power equipment. Electric actuator 30 is capable of making precise control adjustments to variable drive apparatuses, such as variable displacement pump 21.

Electric actuator 30 may be operatively secured to a drive apparatus, such as variable displacement pump 21, through use of a mounting plate 23. Mounting plate 23 is disposed about the control shaft or trunnion arm 22 of variable displacement pump 21. Mounting plate 23 is rotationally aligned by fastener 25 and trunnion arm 22. To effectively prevent any binding of trunnion arm 22 against mounting plate 23, a bushing 26 made of a suitable plastic or other friction reducing material may be disposed therebetween. To aid assembly, bushing 26 may optionally be formed with integral tabs 26a which snap-fit to mounting plate 23 before it is slid over trunnion arm 22, or alternatively, bushing 26 may be integrally formed with mounting plate 23 (not shown). When fastener 25 is appropriately turned down to secure mounting plate 23 to variable displacement pump 21, bushing 26 partially resides in a recess 21a in the housing of variable displacement pump 21. As a further alternative, bracket 23 could be piloted on the outer circumference of recess 21a using a lip or similar structure (not shown) on bracket 23, thereby eliminating the need for bushing 26. This mounting scheme takes advantage of the availability of a threaded lockdown bore 21b for receiving fastener 25 located on the housing of variable displacement pump 21, the same utilized by return to neutral mechanisms of the type illustrated in commonly-owned U.S. Pat. No. 6,487,857, the terms of which are incorporated herein by reference. While use of a mounting plate 23 to join electric actuator 30 to a representative drive apparatus is illustrated in FIGS. 1 and 2 it should be understood that alternate methods, such as forming an integral mounting boss (not shown) on the drive apparatus, are contemplated within the scope of the invention. The completion of the mounting process will be detailed after a discussion of the overall structure of electric actuator 30.

Figure 3:
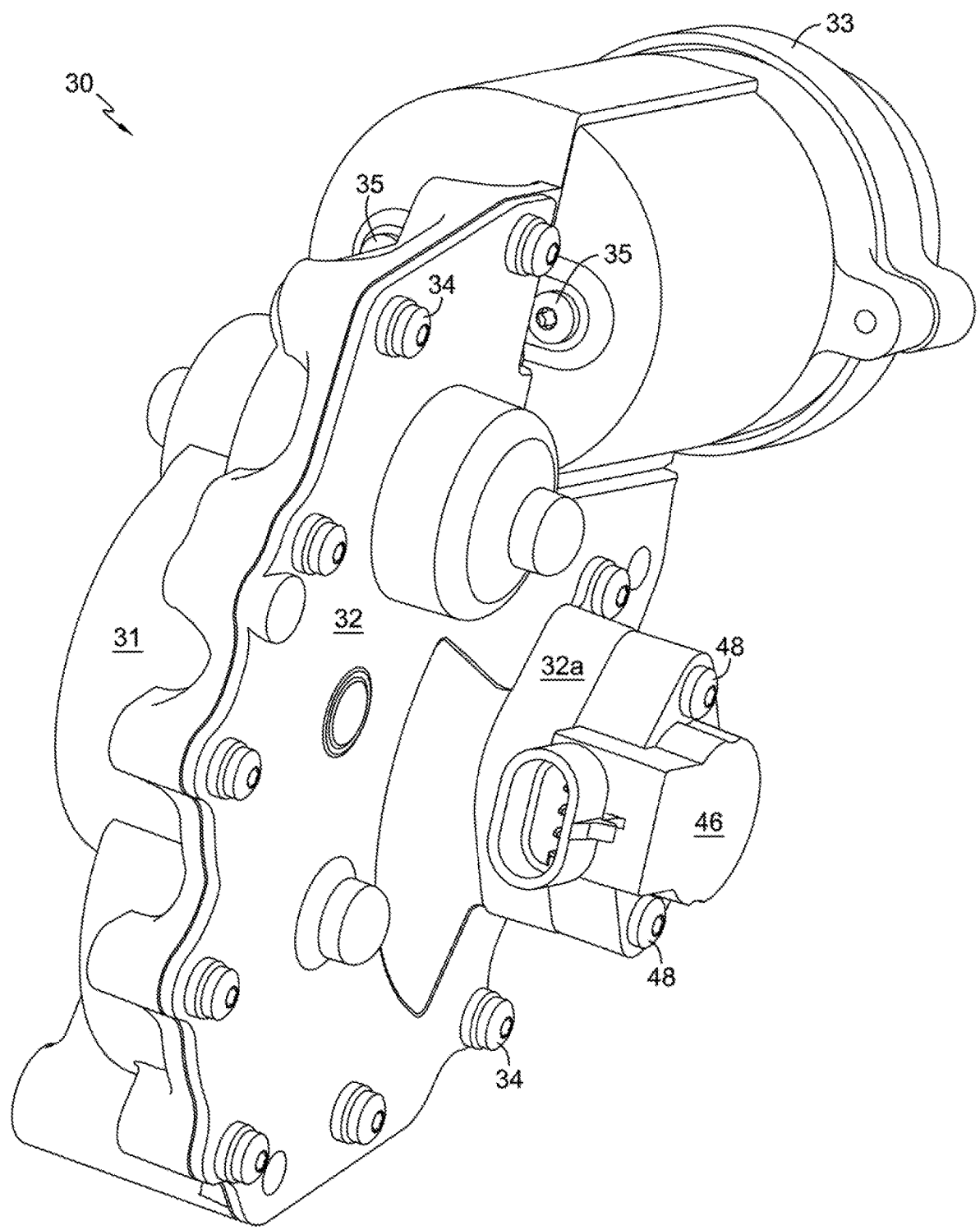
FIG. 3 is a perspective view of the electric actuator of the assembly shown in FIG. 1.
Figure 4:
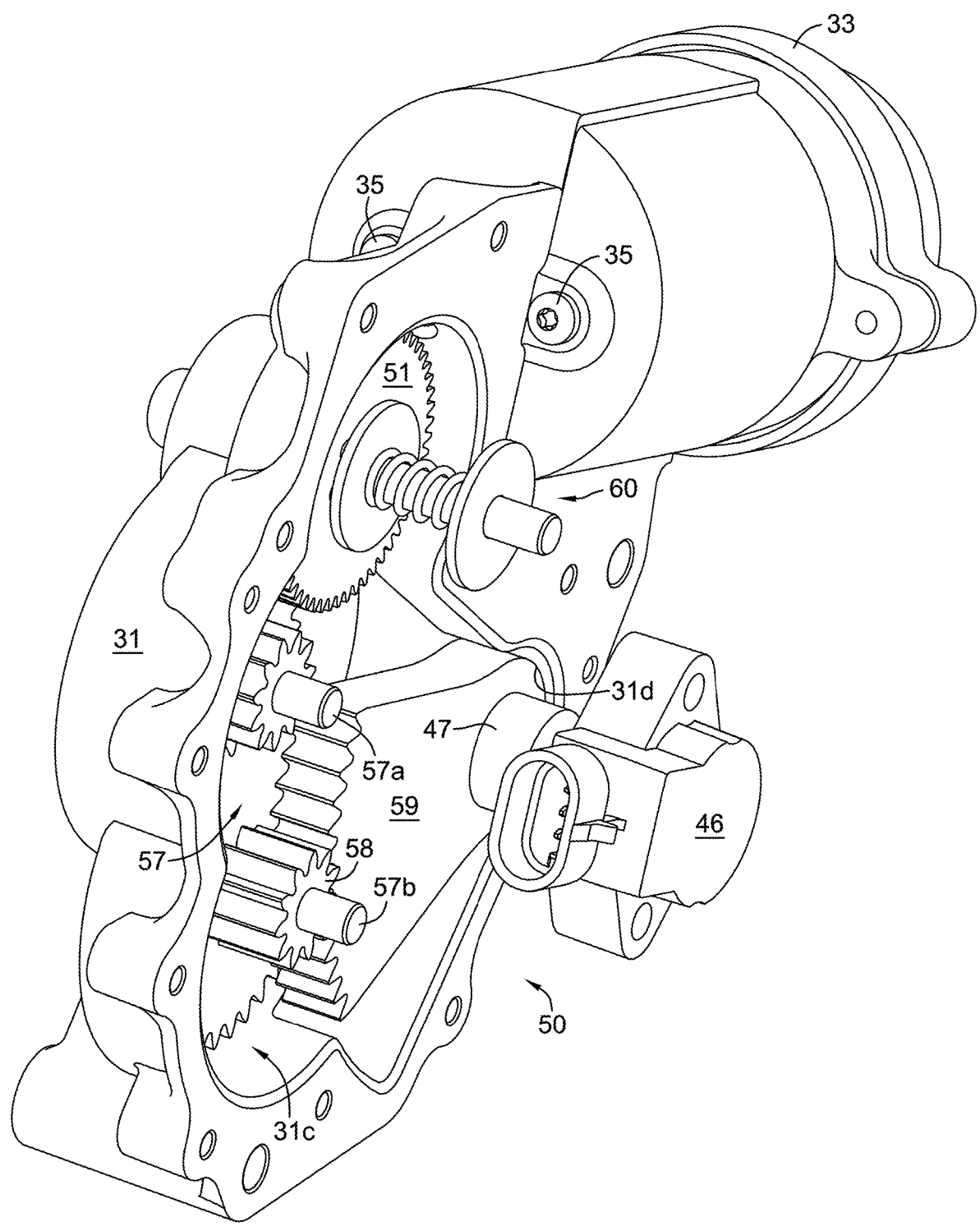
FIG. 4 is a perspective view of the electric actuator shown in FIG. 3, with a housing element removed for clarity.
Figure 5:
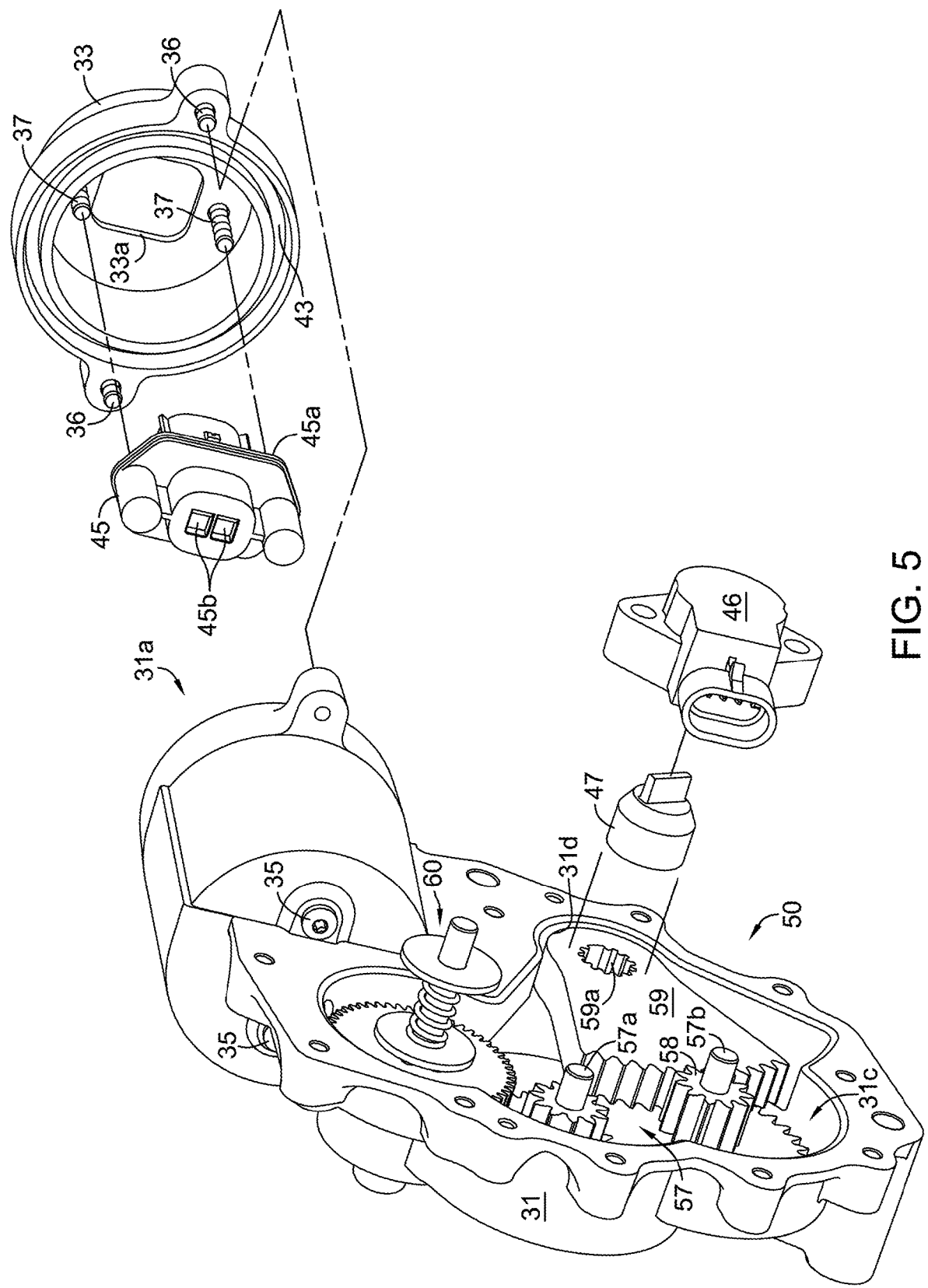
FIG. 5 is a partially exploded view of the electric actuator shown in FIG. 3.

FIGS. 3 to 5 illustrate that electric actuator 30 is a sealed unit having a main housing 31 divided into a motor chamber 31a and a gear chamber 31c. Motor chamber 31a is sized to accommodate an electric motor 40 and is sealed by a cap 33 having an O-ring 43 and an electric connector 45. Electric motor 40 may be, for example, a DC brush-type motor having adequate torque capability to overcome the control moments associated with rotation of a control shaft, e.g. trunnion arm 22. It will be understood that other types of electric motors, such as stepper motors or DC brushless motors, may be used in the actuator with corresponding control logic known in the art. Electric connector 45 passes through an opening 33a in cap 33, sealingly secured thereto by a face seal 45a and fasteners 37. It should be noted that electric connector 45, though depicted herein as separable from cap 33, may be integrally formed with cap 33 to eliminate the need for face seal 45a and fasteners 37. Electric motor 40 is secured within motor chamber 31a by a set of fasteners 35 which pass through main housing 31 to be received by corresponding bores 40a in the housing of electric motor 40. It should be understood that this means for securing electric motor 40 is just one of many known in the art. In this orientation, motor output shaft 40b passes through a bore 31e between motor chamber 31a and gear chamber 31c to provide motive force to reduction gear train 50. Bore 31e also serves as a pilot for motor 40 so that motor output shaft 40b is properly aligned with bushing 42. A pair of conductors (not shown) is used to join the contacts 40c of electric motor 40 to the corresponding contacts 45b of electric connector 45. Fasteners 36 are used to secure cap 33 to main housing 31 after the electrical connections are established during assembly.

Figure 6:
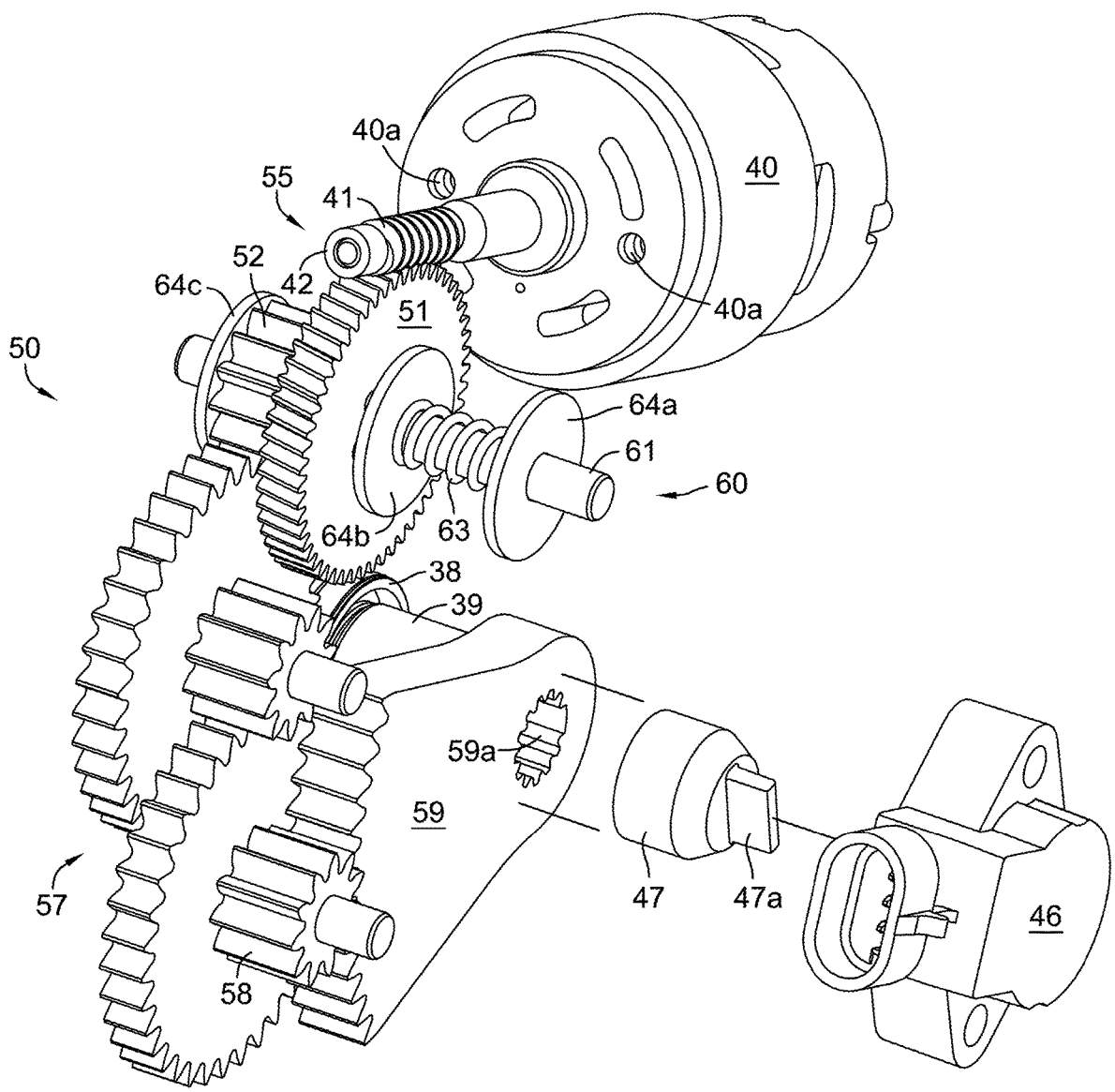
FIG. 6 is a partially exploded view of the electric actuator shown in FIG. 3, with additional components removed for clarity.
Figure 7:
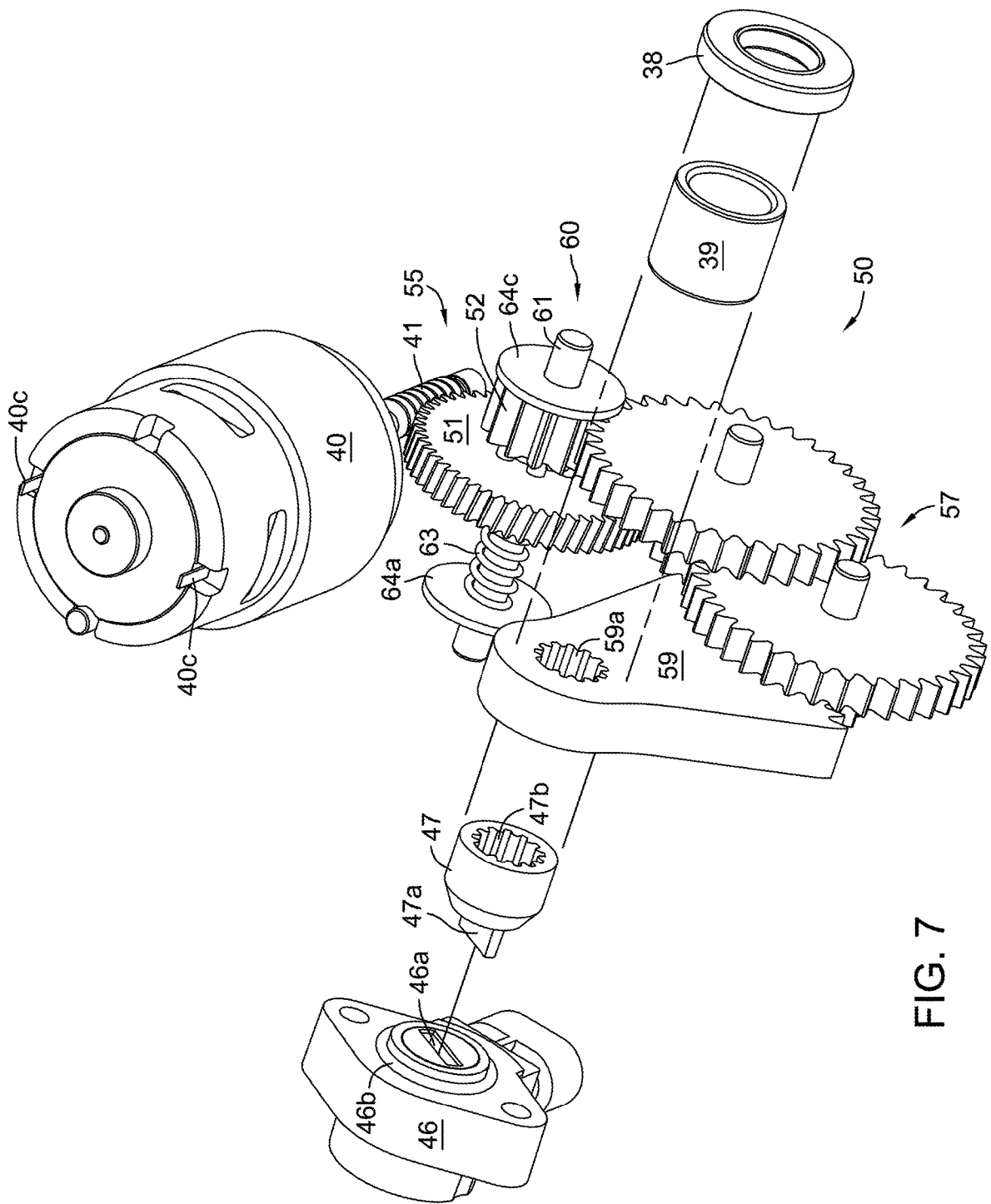
FIG. 7 is another partially exploded view of the electric actuator, rotated from the view illustrated in FIG. 6.
Figure 8:
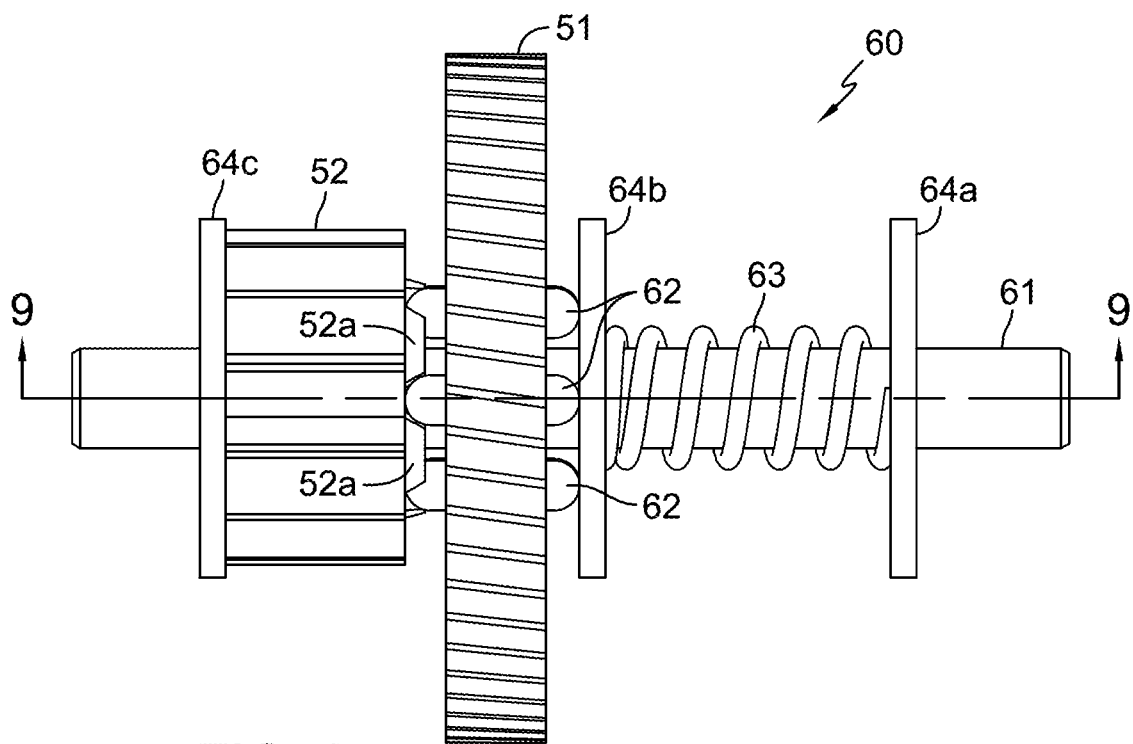
FIG. 8 is a plan view of the clutch assembly of the electric actuator shown in FIG. 6.
Figure 9:
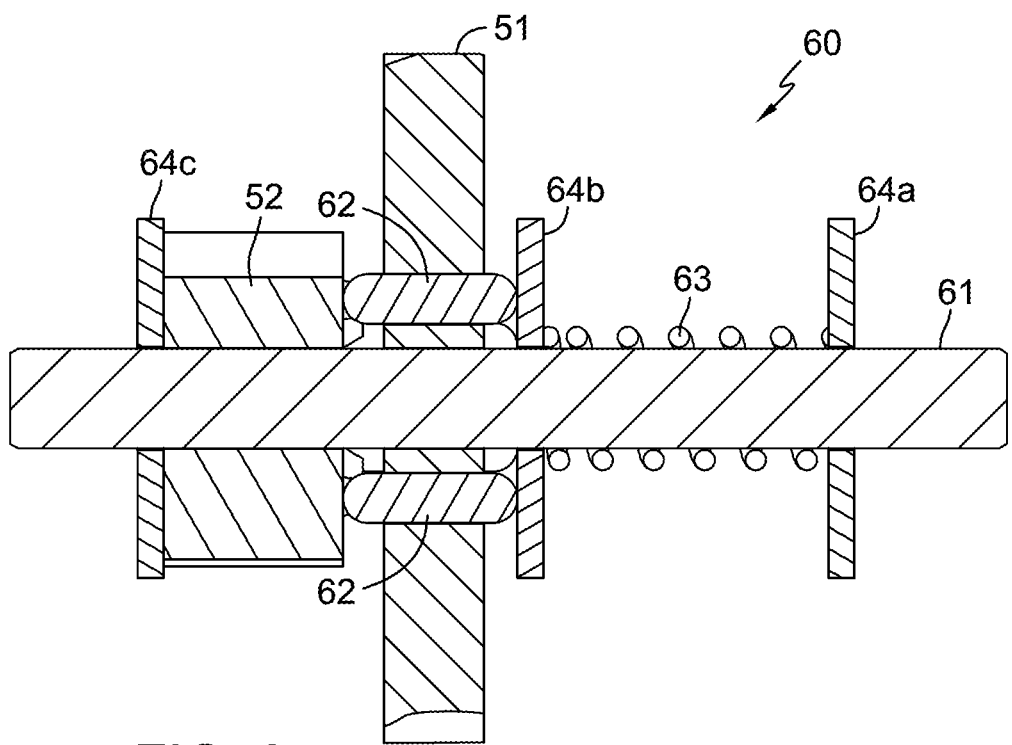
FIG. 9 is a cross-section of the clutch assembly shown in FIG. 8, taken along line 9-9 in FIG. 8.

As shown in, e.g., FIGS. 4 and 5, gear chamber 31c is sized to accommodate a reduction gear train 50 and a slip clutch 60. The reduction gear train 50 and slip clutch 60 are greased assemblies enclosed in gear chamber 31c by a side housing 32. Side housing 32 is secured to main housing 31 by fasteners 34. A liquid sealant material or other means known in the art may be used to seal the housings. As best shown in FIGS. 6 and 7 reduction gear train 50 is constructed of a worm drive 55 engaged to a spur gear reduction 57 of several stages that terminates with a sector gear 59 adapted to receive the control shaft of a drive apparatus, e.g. trunnion arm 22. To aid such engagement, sector gear 59 is retained and aligned by a pocket 31d formed in the sidewall of gear chamber 31c, assisted by its mesh with drive gear 58. Slip clutch 60 is disposed between worm drive 55 and the spur gear reduction 57. It should be understood that the number of reduction stages and the specific gear ratios depicted herein are illustrative only, as these parameters (along with motor output capacity) may be selected for a desired torque output and precision of movement by electric actuator 30. Regardless of number, the various support shafts 57a, 57b of spur gear reduction 57 are supported by main housing 31 and side housing 32. Worm drive 55, in combination with spur gear reduction 57, can be constructed to achieve, for example, a 3000:1 reduction with its resultant torque multiplication.

Figure 6A:
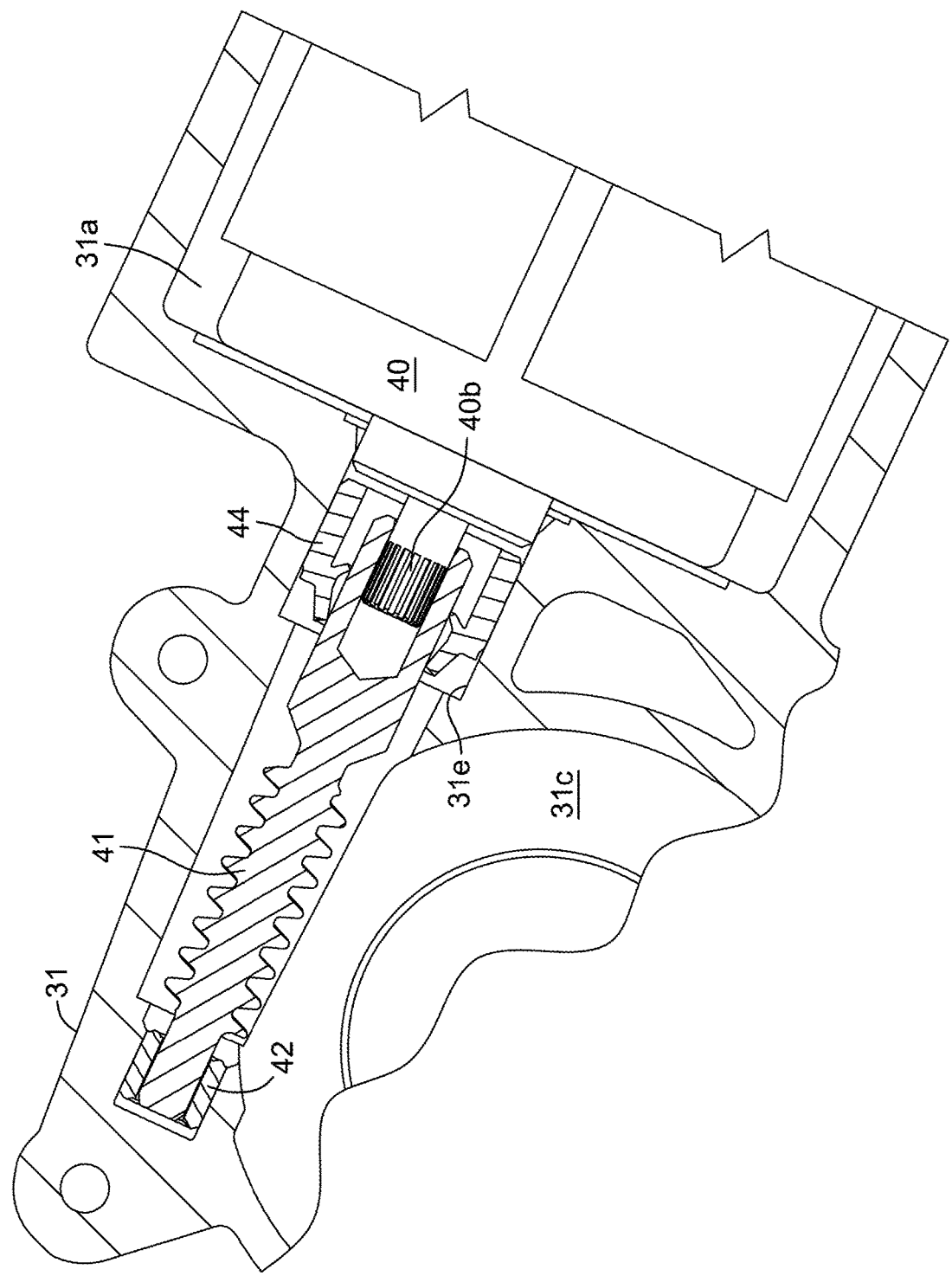
FIG. 6A is a partially cross-sectioned view of certain components of the electric actuator shown in FIG. 3.

As shown most clearly in FIGS. 6 and 6A, worm drive 55 features a worm 41 fixedly disposed on the motor output shaft 40b of electric motor 40, which in turn engages a worm gear 51 rotatably disposed on clutch support shaft 61. Worm 41 may be press-fit to motor output shaft 40b to rotate therewith, or may be secured by other known means. Worm drive 55 is a self-locking design to prevent unwanted movement of the control shaft after a desired control position is established. This feature prevents unnecessary dithering of the electric motor 40 when, for example, increased hydraulic pressure in a drive system featuring variable displacement pump 21 acts against a rotatable swash plate (not shown) engaged to and controlled by trunnion arm 22, rotating the assembly away from its desired position and resultant displacement. The inner workings of an axial piston hydraulic pump, such as variable displacement pump 21, are disclosed in commonly-owned U.S. Pat. No. 6,332,393 and will not be further detailed herein. Seal 44 is disposed adjacent a first end of worm 41 to seal motor chamber 31*a* from gear chamber 31*c,* and bushing 42 is disposed on the opposite end to support worm 41 in housing 31. It will be understood that certain components in FIG. 6A, such as motor 40 and motor output shaft 40*b,* are not cross-sectioned, as such cross-sectioning would not add to the understanding of the figure but would instead add unnecessary complexity.

When electric motor 40 is actuated, motive force is transmitted through reduction gear train 50 to trunnion arm 22. As a result, sector gear 59 causes trunnion arm 22 and its corresponding swash plate (not shown) to rotate. This adjustment of swash plate angle controls both the volume and direction of hydraulic fluid flow from variable displacement pump 21. Electric motor 40, under the influence of appropriate control logic, is capable of driving worm 41 both clockwise and counterclockwise to produce such adjustment.

Critical to the function of electric actuator 30 is control shaft position sensing. This may be accomplished by locating an angular position sensor 46 at the external end of trunnion arm 22. Angular position sensor 46 may incorporate Hall Effect technology to provide a linear response to the angular rotation of trunnion arm 22. Angular position sensor 46 may be fixed to a mounting boss 32*a* formed external to side housing 32 after trunnion arm 22 is inserted through electric actuator 30 in a set process that aids calibration of the unit. Fasteners 48 may be used to retain angular position sensor 46 in place, while an O-ring 46*b* (as shown in FIG. 7) seals the interface between angular position sensor 46 and mounting boss 32*a*. Although angular position sensor 46 is depicted as engaging the external end of trunnion arm 22, it should be understood that a position sensor could be located to monitor the rotational position of any of the gears of spur gear reduction 57, such as drive gear 58.

Prior to insertion, trunnion arm 22 is rotated to a neutral displacement position established during functional testing of variable displacement pump 21. It is desirable to establish a neutral position for the control shaft of any drive apparatus to which electric actuator 30 is applied, prior to assembly with electric actuator 30. A plastic bullet 27 may be utilized to assist with the insertion of trunnion arm 22 through control shaft seal 38, shielding the splines 22*a* of trunnion arm 22 to reduce the likelihood of creating a tear in control shaft seal 38. Following insertion, bullet 27 remains disposed about trunnion arm 22 adjacent to a protrusion 31*b* of main housing 31. The protrusion 31*b* is sized to accommodate control shaft seal 38 and a control shaft bushing 39, through which trunnion arm 22 also passes. Bullet 27 must then be withdrawn from control shaft seal 38 to permit proper sealing about trunnion arm 22. Bullet 27 may remain in place about trunnion arm 22, serving as protection for the control shaft seal 38 from dirt, debris or water spray, or it may be destructively removed. Trunnion arm 22 then fixedly engages and passes through sector gear 59. Proper positioning of sector gear 59 on trunnion arm 22 may be achieved by a clocking of the engagement splines 59*a* of sector gear 59 and the complementary splines 22*a* of trunnion arm 22. This optional alignment feature ensures that sector gear 59 is at the midpoint of its functional arc when trunnion arm 22 is at its neutral position. At this point in the assembly, fasteners 24 may be used to secure electric actuator 30 to mounting plate 23.

Figure 12:
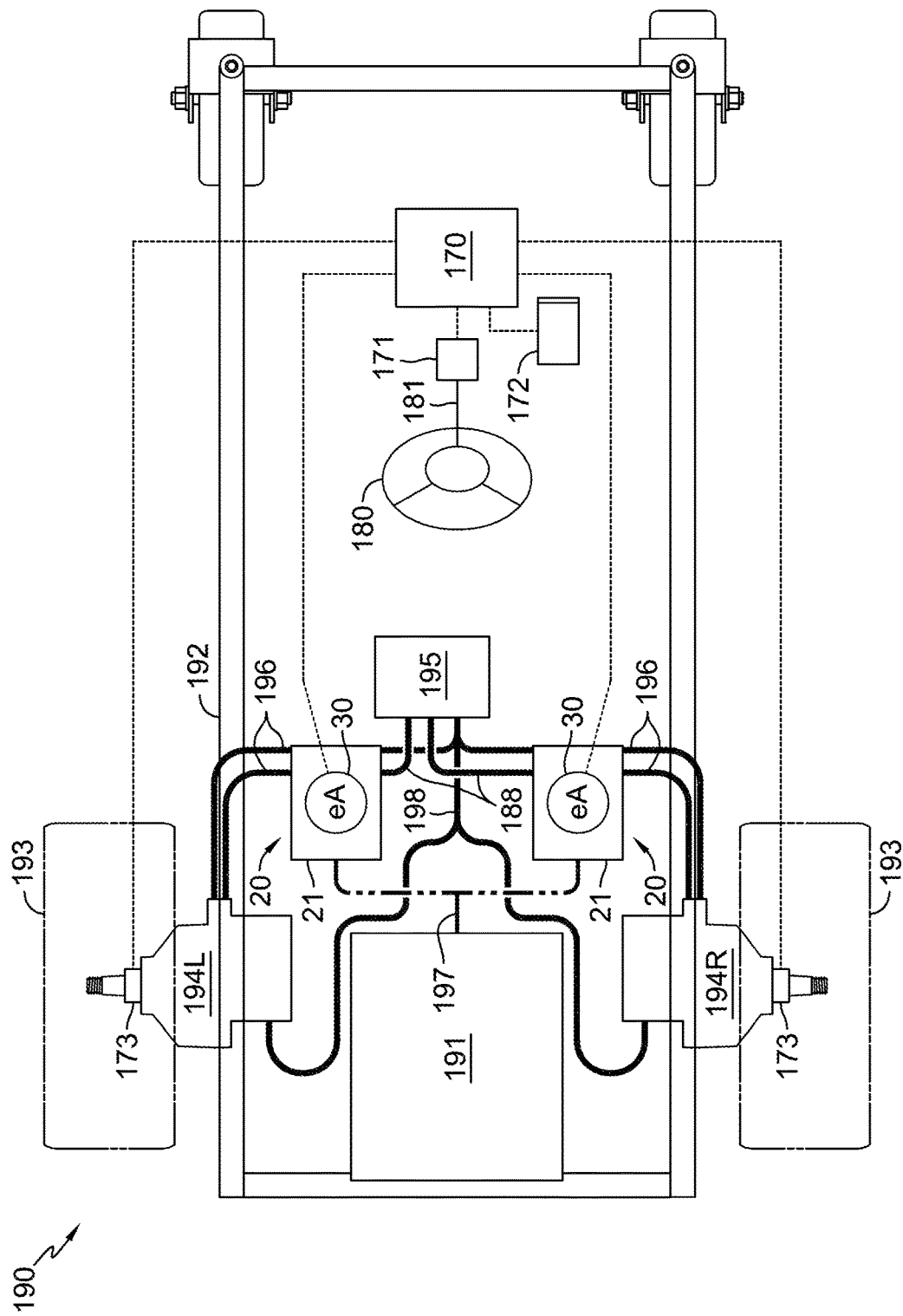
FIG. 12 is a schematic representation of a vehicle equipped with a hydraulic drive system utilizing a pair of electric actuators.

An adapter 47, whose engagement splines 47*b* may be formed with the same clocking feature, is then fitted to the tip of trunnion arm 22. Alternatively, engagement splines 47*b* may be formed with a spiral cut of a few degrees to create an interference fit with the straight splines 22*a* of trunnion arm 22 when pressed together. Adapter 47 has a tang 47*a* adapted to mechanically engage a slot 46*a* in a rotatable portion of angular position sensor 46. It should be understood that the exact form of tang 47*a* and the complementary form in the rotatable portion of angular position sensor 46 may have a different shape, e.g. a cross shape or a hexagonal shape. Tang 47*a* is positioned relative to its clocking feature such that angular position sensor 46 must be rotated against its internal return spring (not shown) to approximately the midpoint of its sensing range to be properly aligned for mounting on mounting boss 32*a*. In this manner, the neutral position of trunnion arm 22 and its corresponding swash plate (not shown) is mechanically and electronically aligned with the midpoint of the sensing range of angular position sensor 46. The angular position sensor 46 may then be connected by a wiring harness (as schematically shown in FIG. 12 to a controller, such as drive controller 170, to communicate the position of trunnion arm 22 to the controller. It should be noted that electric motor 40 is also placed in electrical communication with drive controller 170 by connection of the referenced wiring harness to electric connector 45. Thus, drive controller 170 modulates the desired position of trunnion arm 22 and its corresponding swash plate (not shown) by supplying a controlled voltage or current to electric motor 40 with positional feedback from angular position sensor 46.

Slip clutch 60 protects the gears of reduction gear train 50 from excessive torque and is detailed in FIGS. 8-11. Slip clutch 60 acts to uncouple worm gear 51 from pinion gear 52 when resistance to movement, or excess loading of the reduction gear train 50, is present and sufficient torque is generated by electric motor 40 to overcome the spring force of clutch spring 63. This condition may occur, for example, when electric actuator 30 is bench tested for maintenance purposes. In such an instance, application of power directly to electric actuator 30, without a controller in the test circuit to limit travel of sector gear 59, may cause sector gear 59 to be driven against a sidewall of gear chamber 31*c,* increasing the loading on all gear teeth as the reduction gear train 50 attempts to rotate. In the absence of slip clutch 60, gear teeth, such as those of sector gear 59 and drive gear 58, may break if electric motor 40 has sufficient torque capacity. When electric actuator 30 is applied to the control shaft of a drive apparatus, slip clutch 60 may be set (via choice of clutch spring 63) to a specific torque limit to further protect the internal components of the drive apparatus.

Slip clutch 60 is an assembly disposed about clutch support shaft 61, which is supported at opposing ends by main housing 31 and side housing 32. Clutch pins 62 are slidingly disposed in a plurality of bores 51*a* formed in worm gear 51 that are generally disposed radially about, and parallel to, clutch support shaft 61. Clutch pins 62 have first ends which engage various features on the side of pinion gear 52, and second ends which engage a thrust washer 64b that moves axially along clutch support shaft 61 as slip clutch 60 functions. Slip clutch 60 is bookended by a pair of thrust washers 64a, 64c that are retained in fixed positions along the length of clutch support shaft 61 by side housing 32 and main housing 31, respectively. Main housing 31 also limits axial movement of worm gear 51 along clutch support shaft 61 to prevent worm gear 51 from being disengaged from worm 41 during operation. A clutch spring 63 is disposed about clutch support shaft 61 and bears against both thrust washer 64b and thrust washer 64a. The spring force of clutch spring 63 couples worm gear 51 and pinion gear 52, permitting the transfer of motive force from electric motor 40 through reduction gear train 50 to a control shaft. More specifically, the spring force of clutch spring 63 causes thrust washer 64b to bear against clutch pins 62, which in turn bear against the ramps 52b of projections 52a formed on the side of pinion gear 52, and also bear against the gaps 52c located between the projections 52a. Thus, when worm gear 51 rotates, pinion gear 52 is rotated and rides against thrust washer 64c. When resistance to movement, or excess loading, is present in reduction gear train 50, however, and sufficient torque is generated by electric motor 40, the force of clutch spring 63 is overcome and the first ends of clutch pins 62 traverse the ramps 52b of the projections 52a and slip from gap to gap on the side of pinion gear 52. (As this occurs, the periodic axial movement of clutch pins 62 through bores 51a forces thrust washer 64b to periodically compress clutch spring 63.) Thus, worm gear 51 is momentarily uncoupled from pinion gear 52 and motive force is no longer transmitted through spur gear reduction 57. When resistance to movement, or excess loading, is no longer sufficiently present in reduction gear train 50, clutch pins 62 will cease to traverse the ramps 52b of the projections 52a and thereafter reside in gaps 52c under the influence of clutch spring 63. Thus, worm gear 51 will again be coupled to pinion gear 52 to drive spur gear reduction 57.

Figure 13:
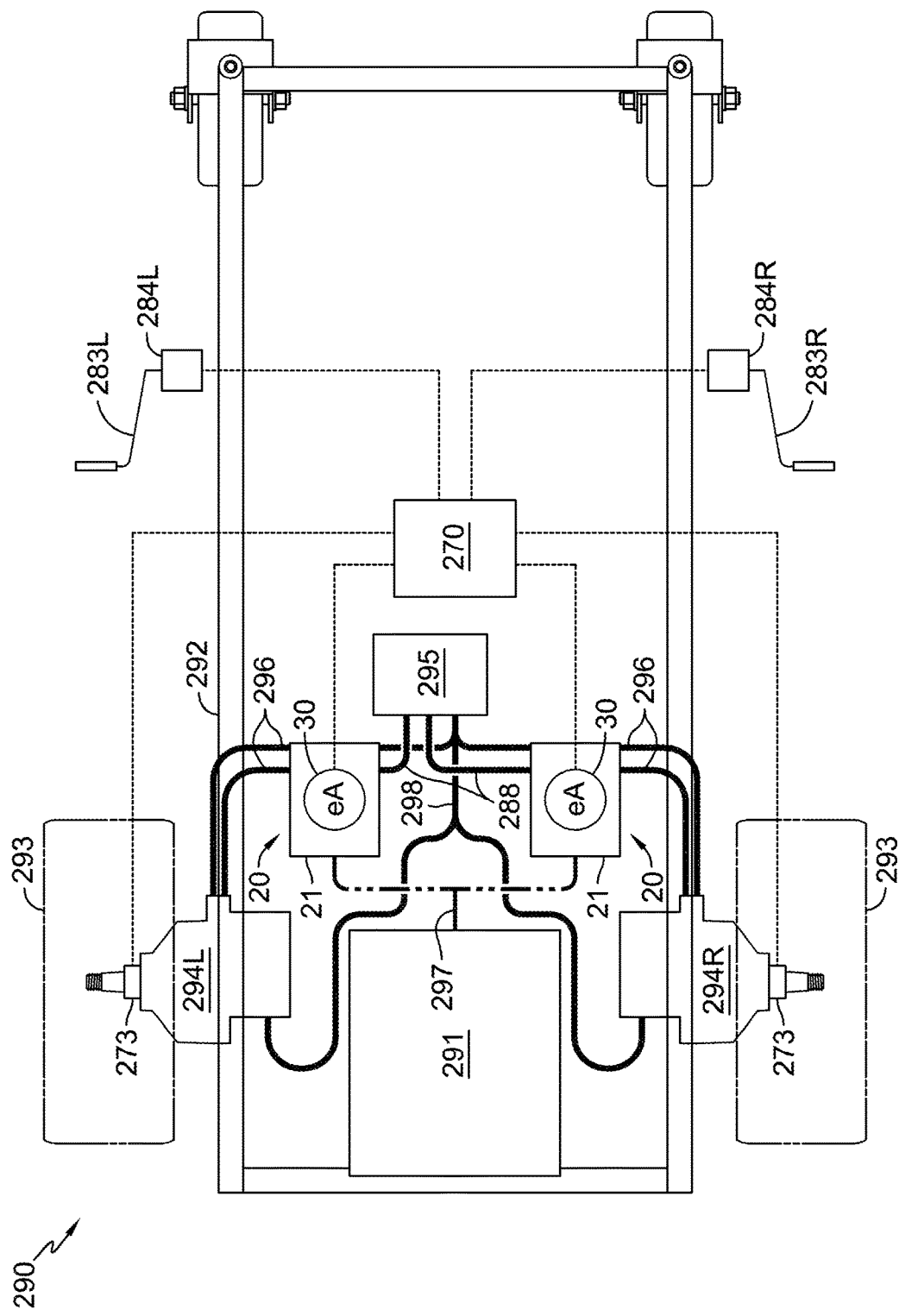
FIG. 13 is a schematic representation of another vehicle equipped with a hydraulic drive system utilizing a pair of electric actuators.
Figure 14:
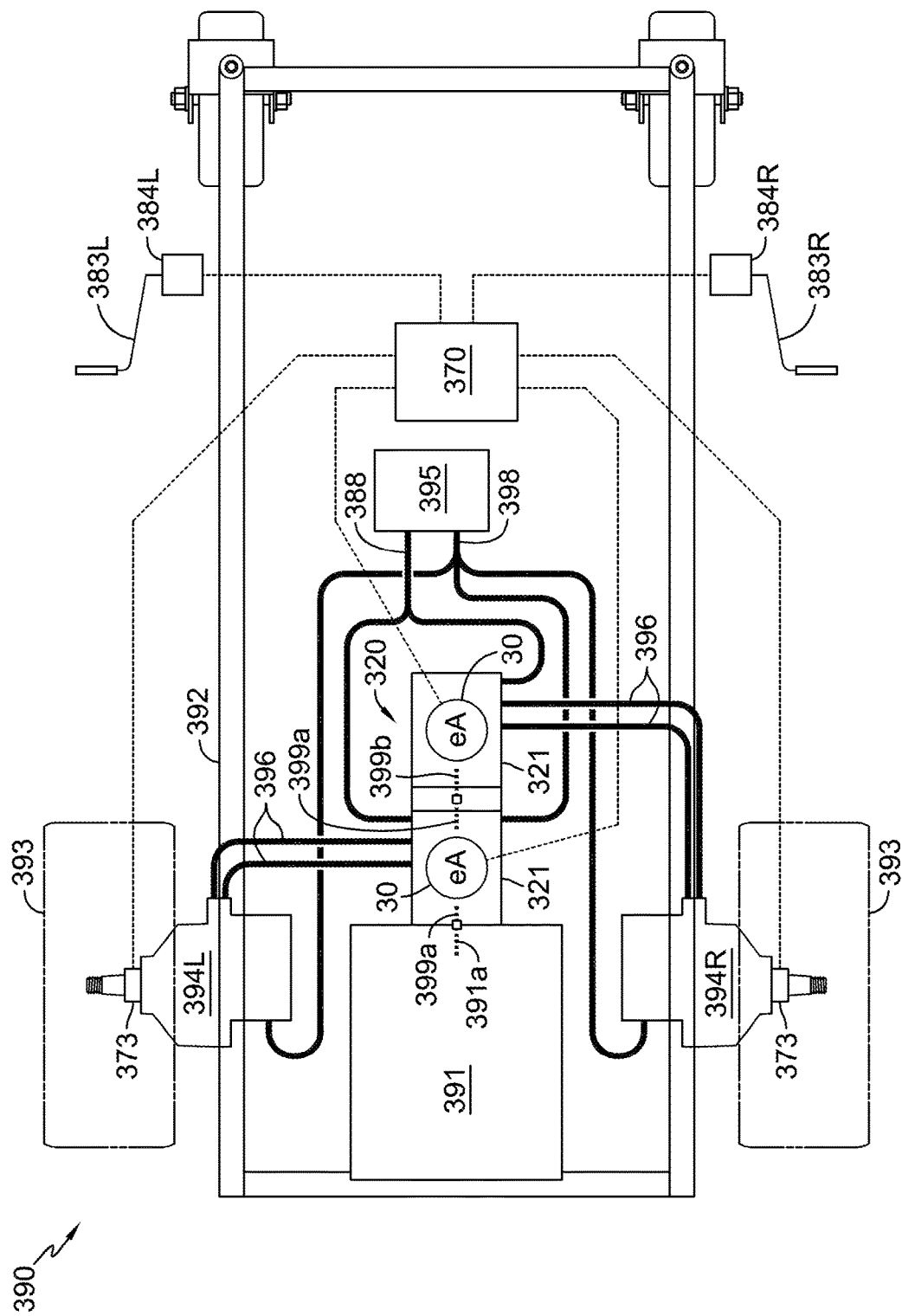
FIG. 14 is a schematic representation of a further vehicle equipped with a hydraulic drive system utilizing a pair of electric actuators.

FIGS. 12 and 13 illustrate a pair of representative zero turn vehicles 190, 290, each incorporating a pair of drive assemblies 20, and FIG. 14 illustrates a representative zero turn vehicle 390 with a single drive assembly 320. FIG. 12 depicts vehicle 190 having hydraulic motors 194L, 194R mounted to a frame 192. Each hydraulic motor independently drives a rear wheel 193 to provide steering and drive for vehicle 190. Prime mover 191 provides power to the variable displacement pumps 21 through a power transfer assembly, such as a belt and pulley assembly 197 (shown schematically). Prime mover 191 may be an internal combustion engine or electric motor having an electrical power source. Variable displacement pumps 21 draw hydraulic fluid from reservoir 195 as needed and circulate hydraulic fluid through hydraulic circuit lines or hoses 196 to drive the hydraulic motors 194L, 194R. Hydraulic fluid is returned to reservoir 195 from the variable displacement pumps 21 and hydraulic motors 194L, 194R via drain lines 198.

To generate steering inputs for a drive controller 170, a steering wheel 180, steering column 181 and steering position sensor 171 (e.g. a potentiometer to indicate the rotational position of steering column 181) are provided. To generate speed inputs (amplitude) and direction inputs (forward or reverse), an accelerator pedal 172, such as a rocker-style pedal, is provided which also incorporates a position sensor (not shown). Drive controller 170 receives and processes input signals from the position sensor of accelerator pedal 172 and the steering position sensor 171 to generate control signals (generally, an applied voltage or current) for the electric motors 40 of the electric actuators 30. In order to more finely tune the desired position of trunnion arms 22 and the corresponding output of the variable displacement pumps 21, drive controller 170 further receives feedback from the angular position sensors 46 of the electric actuators 30, and optionally may also receive and use feedback from a pair of axle speed sensors 173. A description of various control algorithms for an electric actuator that provide vehicle drive characteristics and safety features is detailed in commonly-owned U.S. Patent Pub. No. 2008/0018269, the terms of which are incorporated herein by reference, and shall not be further described herein. Electrical energy may be supplied to drive controller 170 by an independent electrical power source, such as a battery (not shown), or an alternator or generator (not shown) associated with prime mover 191.

FIG. 13 depicts a vehicle 290 that is similar to vehicle 190, but is equipped with control sticks 283L, 283R having associated position sensors 284L, 284R to generate operator control inputs. These replace the steering wheel 180 and steering column 181, the accelerator pedal 172, and the associated position sensors 171, 172 utilized on vehicle 190. Typical of zero turn vehicles, control sticks 283L, 283R are used to impart an operator's steering, speed and direction inputs to the drive system; or in this instance, to a drive controller 270. The control algorithms detailed in commonly owned U.S. Patent Pub. No. 2008/0018269, are also applicable to the vehicle drive configuration of vehicle 290, and shall not be further described herein. In addition to control sticks 283L, 283R, it should be understood that other operator input devices, such as a joystick (not shown), could be used in combination with a drive controller 270 to impart an operator's steering, speed and direction inputs to the drive system, wherein the operator input device generates an analog signal, or a digital signal utilizing a CAN Bus protocol.

FIG. 14 depicts a vehicle 390 that is similar to vehicles 190 and 290, but with variable displacement pumps 321 and electric actuators 30 in a single drive assembly 320 configured in a tandem arrangement with a prime mover 391. The variable displacement pumps 321 are an embodiment of the variable displacement pumps 21 described with respect to vehicles 190 and 290. A description of various tandem pump arrangements is detailed in commonly owned U.S. Pat. No. 6,494,686, the terms of which are incorporated herein by reference, and shall not be further described herein. The prime mover 391 provides power to the variable displacement pumps 321 through an output shaft 391a. The output shaft 391a is coupled to the pump shafts 399a, 399b of the variable displacement pumps 321 in a collinear arrangement. In particular, the output shaft 391a is coupled to the pump shaft 399a of the variable displacement pump 321 positioned next to the prime mover 391, and the pump shaft 399a is coupled to the pump shaft 399b of the other variable displacement pump 321. Accordingly, each of the shafts 391a, 399a, 399b generally has the same axis of rotation.

Figure 15:
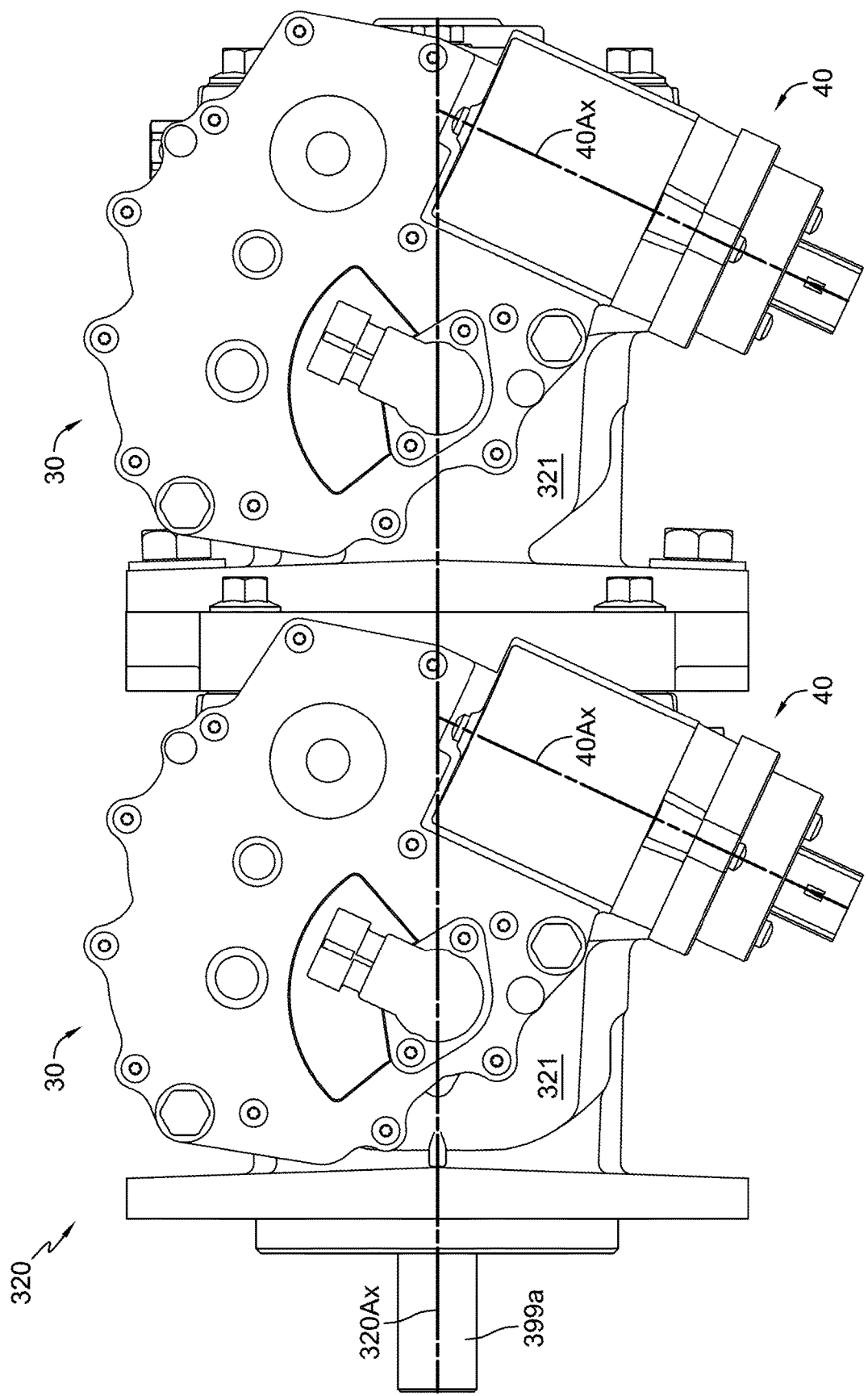
FIG. 15 is a plan view of an embodiment of a pair of electric actuators, each of the pair of electric actuators applied to a pump forming a respective drive assembly.

FIG. 15 illustrates the tandem arrangement of the variable displacement pumps 321 and electric actuators in a single drive assembly 320, as can be included in the vehicle 390 of FIG. 14. The variable displacement pumps 321 are positioned next to one another so that their respective pump shafts 399a, 399b are arranged collinearly. The pump shaft 399a can be coupled to an output shaft (not shown) of the prime mover so that the output shaft and the pump shafts 399a, 399b have the same axis of rotation 320 Ax. An electric actuator 30 is mounted to each of the variable displacement pumps 321 through the use of a mounting plate 23, as described previously, to effectuate control of the variable displacement pumps 321. In particular, the trunnion arm 22 of the variable displacement pump 321 is coupled or engaged to a reduction gear train 50 in the electric actuator 30. The angles of the electric actuators 30 mounted to each of the variable displacement pumps 321 are substantially the same with respect to the pump shafts 399a, 399b. In particular, the electric motors 40 on each of the electric actuators 30 are oriented such that the electric motors have parallel axes 40 Ax at substantially the same angle with respect to the pump shafts 399a, 399b.

The permitted range of motion that electric actuator 30 imparts to a control shaft, such as the trunnion arm 22 of variable displacement pump 21, 321, may be calibrated in association with application of drive assembly 20, 320 to the end-use vehicle or other mobile power equipment. After the previously described mounting of electric actuator 30 to variable displacement pump 21, 321, wherein the neutral position of trunnion arm 22 and its corresponding swash plate (not shown) is mechanically and electronically aligned with the midpoint of the sensing range of angular position sensor 46, drive assembly 20, 320 is mounted to a vehicle, such as zero turn vehicle 190, 290, 390, or other mobile power equipment, and placed in electronic communication with a controller, such as drive controller 170, 270, 370. Electric motor 40 is slowly driven in a first rotational direction until trunnion arm 22 and its corresponding swash plate are rotated away from the neutral position and the swash plate encounters a first mechanical stop within the housing of variable displacement pump 21. Drive controller 170, 270, 370 senses and learns this positional limit by the cessation of a change in angular position feedback from angular position sensor 46 and a spike in applied voltage as resistance to motion in the reduction gear train 50 builds. The dimensions of gear chamber 31c are such that sector gear 59 does not encounter a sidewall of gear chamber 31c when the swash plate hits its mechanical limit of angular rotation. Electric motor 40 is then slowly driven in a second rotation direction until trunnion arm 22 and its corresponding swash plate are rotated past neutral to a second mechanical stop within the housing of variable displacement pump 21, 321. Drive controller 170, 270, 370 again senses and learns the positional limit. It is desirable to program an offset of a few rotational degrees from these positional limits into controller 170, 270, 370 to protect the components of variable displacement pump 21, 321. The neutral position of variable displacement pump 21, 321 may be calculated by drive controller 170, 270, 370 as the midpoint of the sensing range between the two offsets. In a vehicle such as zero turn vehicle 190, 290, 390, additional fine tuning of the neutral point is optionally provided by additional feedback to drive controller 170, 270, 370 from axle speed sensors 173, 273, 373 that monitor rotational movement of the axles of hydraulic motors 194L, 194R, 294L, 294R, 394L, 394R. In actuality, it is desirable to program a neutral dead band in drive controller 170 to prevent aggressive drive characteristics upon initial actuation of accelerator pedal 172. A control algorithm related to neutral dead bands is detailed in commonly-owned U.S. Patent Pub. No. 2008/0018269, and shall not be further described herein.

A further embodiment is depicted in FIGS. 16 to 22, for applications using zero turn hydrostatic transaxles 420L and 420R, where each actuator is integrated with its respective transaxle to reduce or eliminate the need for separate actuator housings.

Figure 19:
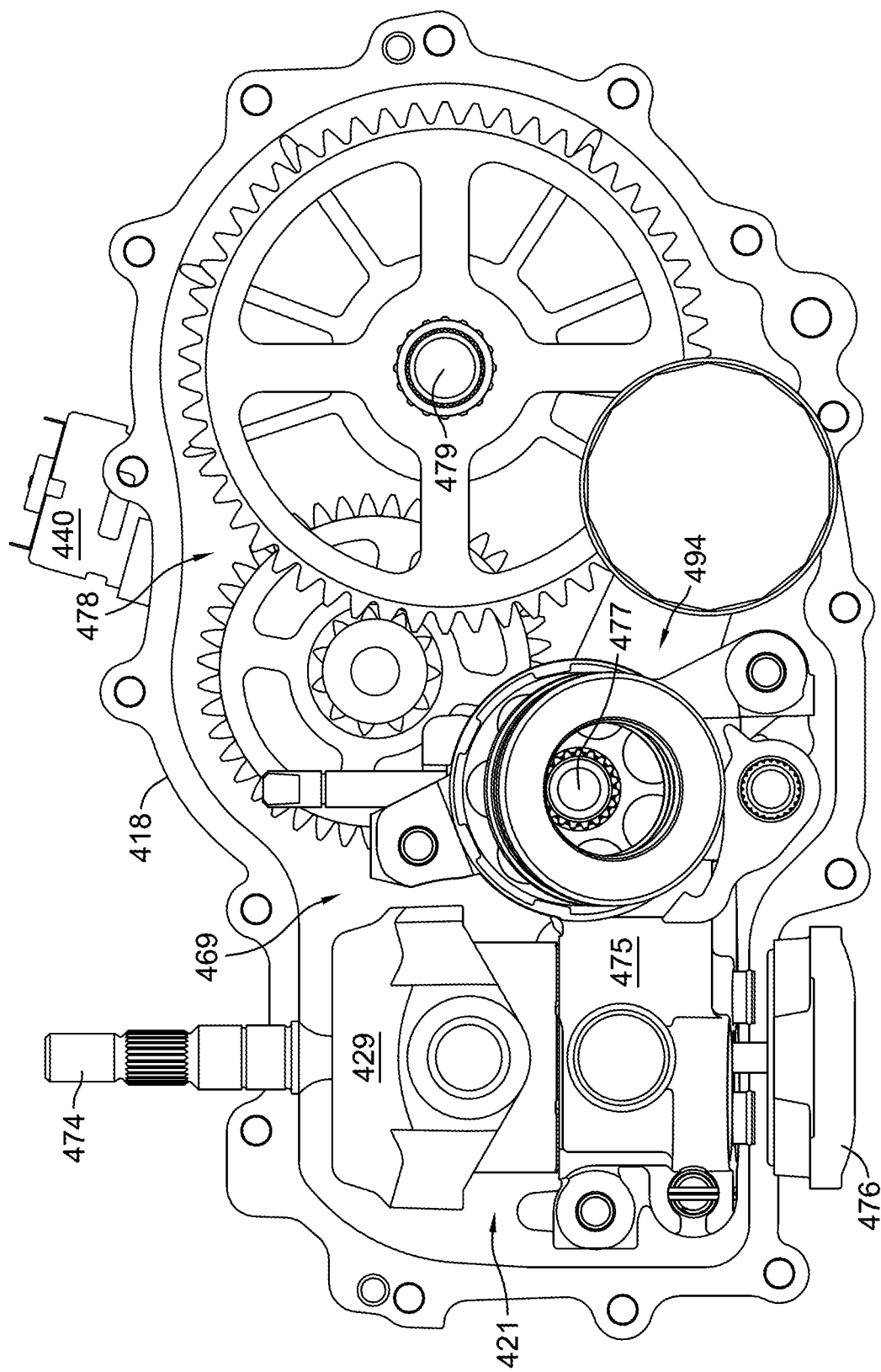
FIG. 19 is an interior elevational view of the transaxle of FIG. 16, from the opposite or axle side of the transaxle, with the main housing component removed to show the interior components of the transaxle.

Except as described herein, the internal structure and operation of transaxles 420L and 420R can be substantially identical to that shown and described in commonly-owned U.S. Pat. No. 7,134,276, the terms of which are incorporated herein by reference in their entirety. FIG. 19 shows the internal structure of transaxles 420L, 420R, including hydraulic pump 421 rotatably disposed on center section 475 in main sump chamber 469 and controlled by swash plate 429. Hydraulic motor 494 is similarly disposed in main sump chamber 469 and drives motor output shaft 477, which in turn powers reduction gear train 478 to provide motive force to output axle 479. Pump input shaft 474 provides motive force to pump 421 and may also drive an optional charge pump 476.

Figure 16:
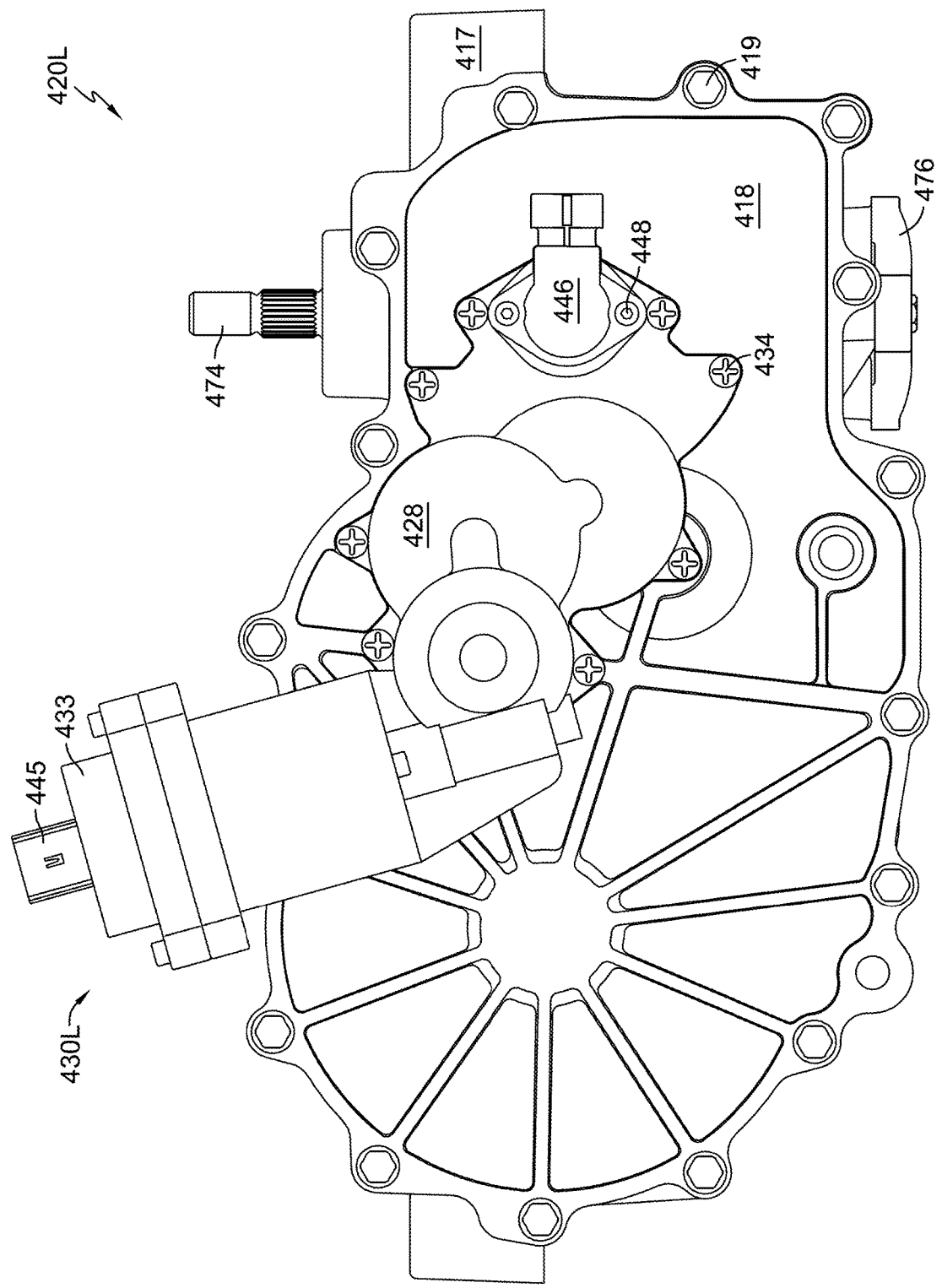
FIG. 16 is an elevational view of a further embodiment incorporating an electric actuator integrated with a zero turn hydrostatic transaxle.
Figure 17:
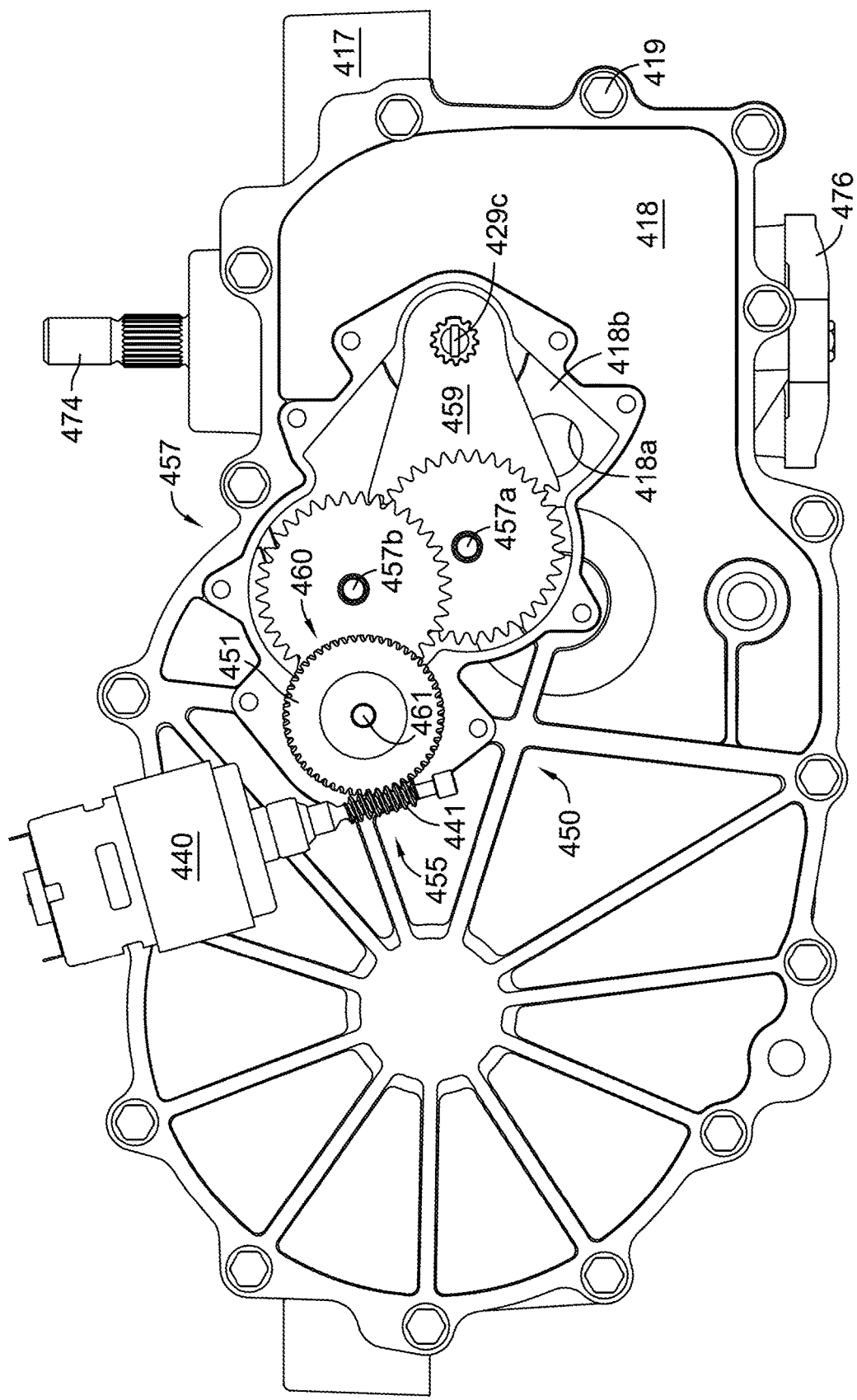
FIG. 17 is an elevational view of the actuator and transaxle of FIG. 16, wherein certain cover elements of the actuator have been removed to show interior details of the actuator.
Figure 18:
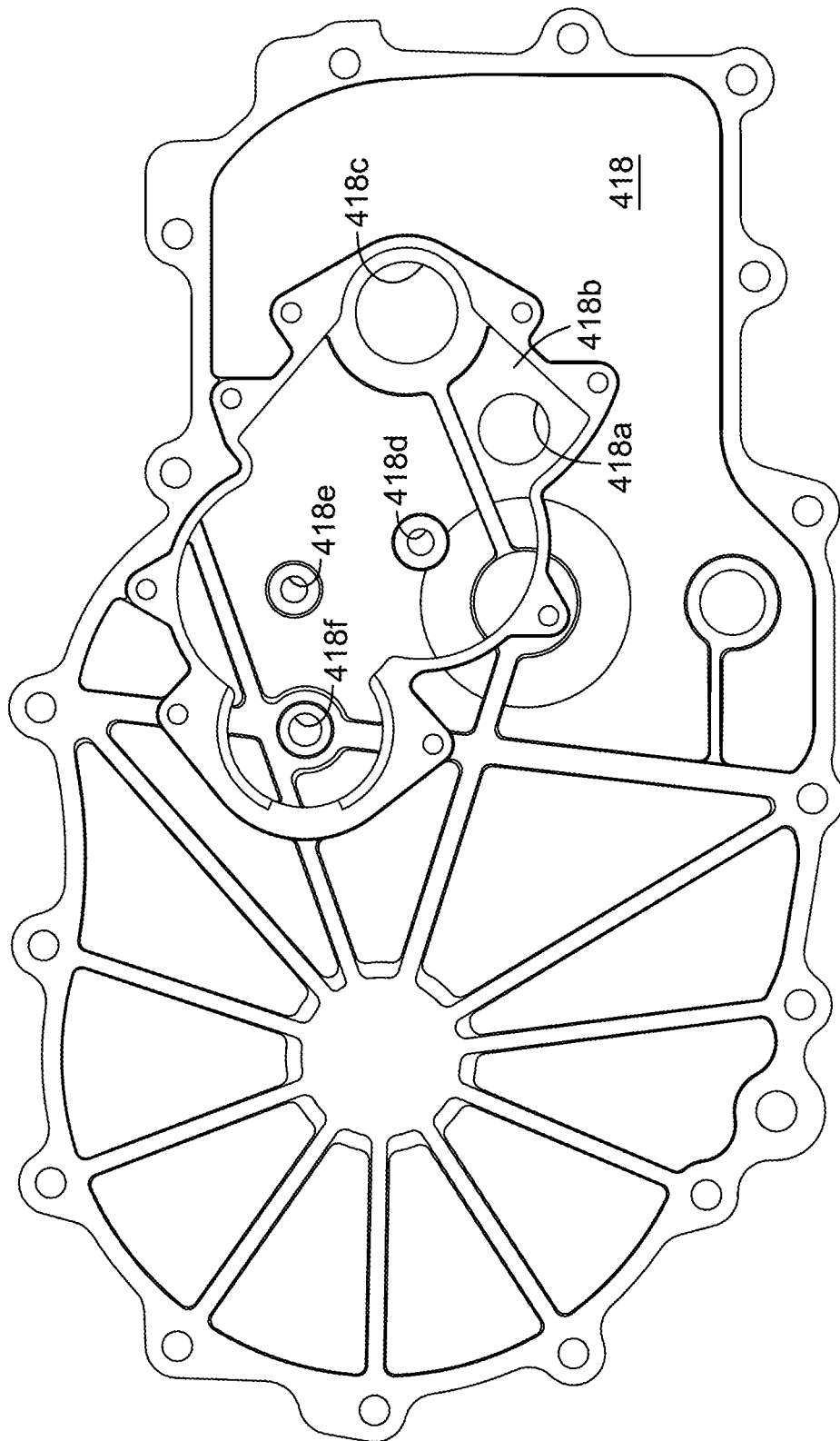
FIG. 18 is a further elevational view of the transaxle of FIG. 16 with further elements of the actuator removed.

Transaxle 420L and integrated electric actuator assembly 430L will be described in detail herein with the understanding that transaxle 420R and electric actuator assembly 430R will be essentially functionally identical thereto. Turning to FIGS. 16 to 18, one can see side housing 418, which is secured to main housing 417 to form internal sump 469 by means of a plurality of fasteners 419. Actuator housing 428 may be secured directly to side housing 418 to form gear chamber 418b. Side housing 418 has a swash plate support opening 418c that rotationally supports swash plate 429 and enables its integral control shaft 429a to engage sector gear 459 within gear chamber 418b. Passage 418a connect gear chamber 418b to main sump chamber 469 to form a common sump, such that the hydraulic elements and actuator gears share common oil in contrast to the greased lubricant utilized by the reduction gear train 50 and slip clutch 60 of electric actuator 30. It will be understood that the gearing aspects of actuator 430L, such as spur gear reduction 457 and sector gear 459, could be disposed inside main sump chamber 469 to achieve this integration and sharing of common oil.

Swash plate 429 is shown most clearly in FIG. 20 and includes control shaft 429a which has splines 429b formed thereon, along with an integral tang 429c, which eliminates the need for a separate adapter 47 as in prior embodiments. Tang 429c engages position sensor 446, which is secured external to actuator housing 428 by means of fasteners 448. Splines 429b mate with splines 459a of sector gear 459. Spur gear reduction 457 includes a pair of jack shafts 457a and 457b for mounting gears of gear train 450 thereon, and bosses 418d, 418e, 418f may be formed in side housing 418 to engage and support the ends of the various shafts.

Actuator 430L also includes motor end cap 433 and electrical connector 445. Electric motor 440 drives worm 441 to drive worm gear 451 of worm drive 455, which drives pinion gear 452 and spur gear reduction 457 to rotate sector gear 459, in a manner similar to that previously described. Clutch assembly 460 is engaged to pinion gear 452 and comprises clutch support shaft 461 extending through pinion gear 452 and worm gear 451. Clutch pins 462, washers 464a and 464b, and spring 463 operate similarly to the previously described embodiment. Spring 463 is somewhat larger than the spring in the prior clutch embodiments, and it may be desirable to add a spacer 465 to keep spring 463 centered.

Figure 24:
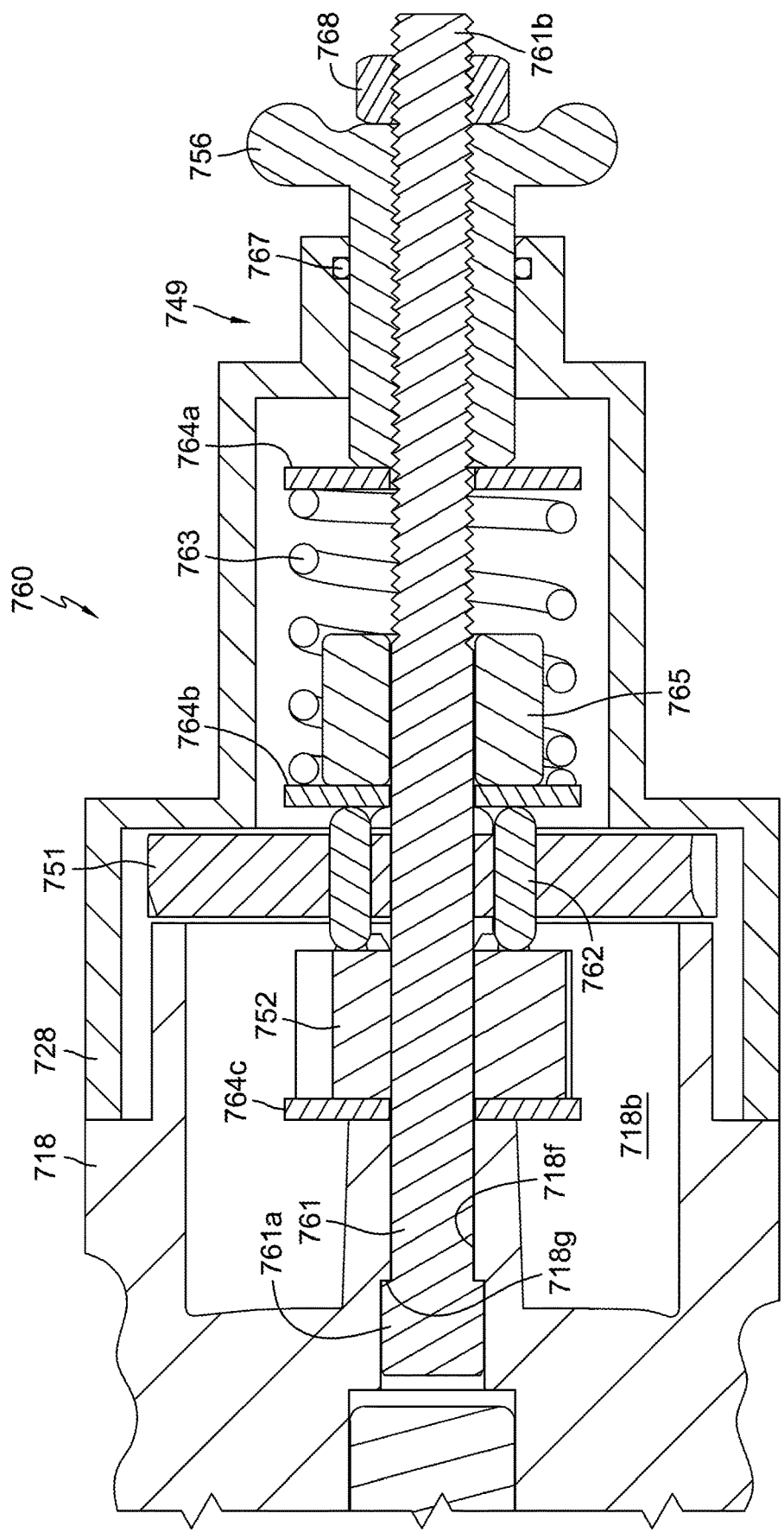
FIG. 24 is a cross-sectional view of another embodiment of the clutch assembly incorporating a clutch spring compression adjustment mechanism.

In another embodiment of the clutch assembly, depicted in FIG. 21, a clutch spring compression adjustment mechanism 449 is included, and comprises a clutch shaft support screw 466 configured to receive an end 461b of support shaft 461 within a bore 466a and having external threads 466c to engage an opening (not shown) in actuator housing 428, and whose relative location along support shaft 461 is secured by means of locking nuts 468a, 468b. Hex 466b enables external adjustment of the compression of spring 463, whereby rotation of hex 466b causes clutch shaft support screw 466 to adjust the position of washer 464a, changing the compression of spring 463. Unlike prior embodiments, wherein the position of the outermost washer was fixed, washer 464*a* must be free to travel along support shaft 461 in this adjustable application. FIG. 24 shows yet another embodiment of an alternative clutch spring compression adjustment mechanism 749 for clutch assembly 760. Clutch support shaft 761 has an enlarged end 761*a* that engages shoulder 718*g* in side housing 718 to limit its range of axial movement. Support shaft 761 extends out boss 718*f* formed in side housing 718, and the opposite end 761*b* of support shaft 761 is threaded and extends out of actuator housing 728 through nut 756, which may be in the shape of a wing nut or the like, and which enables adjustment of the compression of spring 763 by rotation of nut 756 and engagement with washer 764*a*. Locking nut 768 is also provided to lock nut 756 in place after proper adjustment is made. Other elements of this design, such as washers 764*b*, 764*c*, worm gear 751, pinion gear 752, spacer 765 and clutch pins 762 may be similar to those previously described. It will be understood that in these embodiments appropriate seals or sealants, such as seal 767 in FIG. 24, may need to be used.

Figure 22:
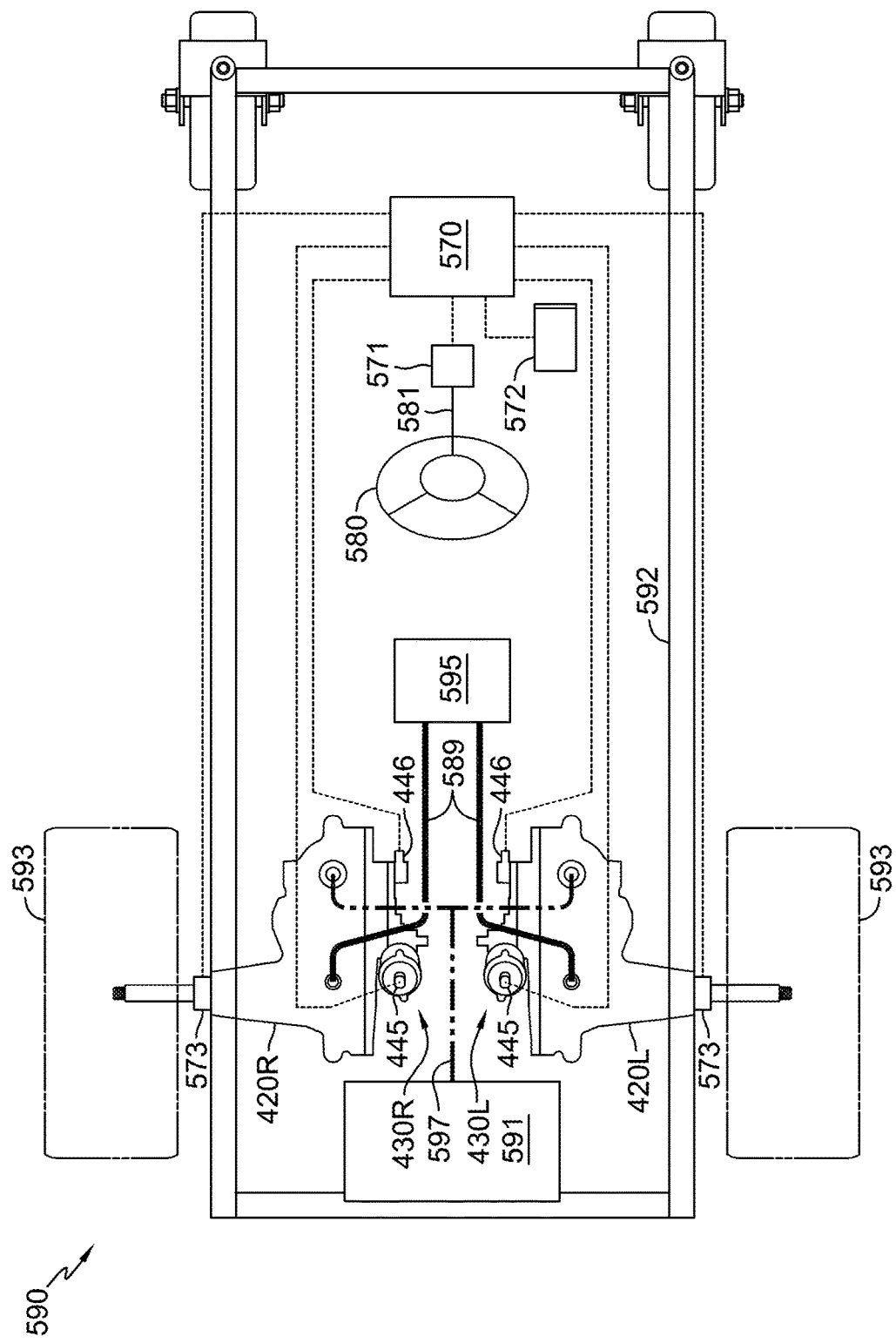
FIG. 22 is a schematic representation of a vehicle equipped with a hydraulic drive system utilizing a pair of electric actuators and transaxles as depicted in FIG. 16.
Figure 23:
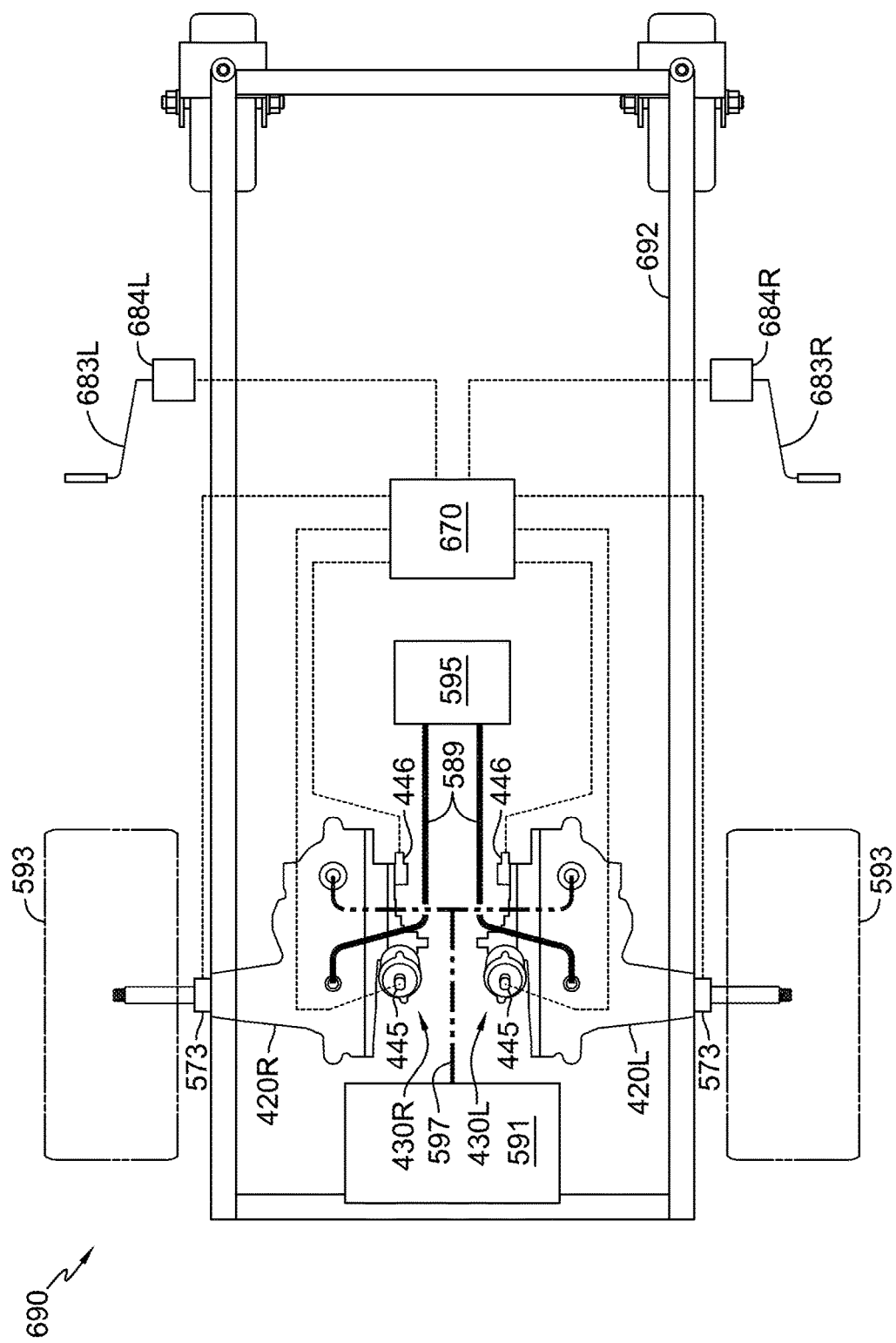
FIG. 23 is a schematic representation of a vehicle similar to that depicted in FIG. 22, with certain variations in control systems.

FIGS. 22 and 23 show alternative embodiments of vehicles 590 and 690 incorporating transaxles 420L and 420R as previously described. A prime mover 591 drives a belt and pulley assembly 597 to power both transaxles 420L, 420R to drive wheels 593, and reservoir lines 589 connect the transaxles 420L, 420R to reservoir 595. Vehicle 590 uses steering wheel 580, drive controller 570, steering position sensor 571 and pedal 572 as previously described to provide input and control of the two transaxles 420L, 420R. Vehicle 690, on the other hand, uses control sticks 683L, 683R, corresponding position sensors 684L, 684R, and drive controller 670 for similar purposes.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A vehicle, comprising:
  a first driven wheel and a second driven wheel;
  a drive controller disposed on the vehicle;
  a first drive assembly engaged to and driving the first driven wheel, the first drive assembly having a first control shaft, and a second drive assembly engaged to and driving the second driven wheel, the second drive assembly having a second control shaft;
  a first actuator assembly engaged to the first control shaft of the first drive assembly, and a second actuator assembly engaged to the second control shaft of the second drive assembly, wherein the first actuator assembly and the second actuator assembly each comprise:
    an actuator housing having a motor chamber and a gear chamber;
    an electric motor disposed in the motor chamber and comprising a motor output shaft passing through to the gear chamber;
    a worm drive disposed in the gear chamber and driven by the motor output shaft;
    a spur gear reduction disposed in the gear chamber and driven by the worm drive, wherein the spur gear reduction is engaged to the respective first control shaft or second control shaft to adjust a rotational position of the respective control shaft;
    a position sensor located at and operatively engaged to a first end of the respective control shaft for communicating the rotational position of the respective control shaft to the drive controller; and
    a slip clutch disposed in the gear chamber between the worm drive and the spur gear reduction.

2. The vehicle of claim 1, wherein the position sensor of the first actuator assembly communicates the rotational position of the first control shaft to the drive controller, and the second actuator assembly communicates the rotational position of the second control shaft to the drive controller.

3. The vehicle of claim 1, wherein
  the first drive assembly comprises a first hydraulic pump having a first pump housing, and a first hydraulic motor hydraulically connected to the first hydraulic pump, the first hydraulic motor directly engaged to and driving the first driven wheel; and
  the second drive assembly comprises a second hydraulic pump having a second pump housing, and a second hydraulic motor hydraulically connected to the first hydraulic pump, the second hydraulic motor directly engaged to and driving the second driven wheel; and
  wherein the first actuator assembly is engaged to the first pump housing and the second actuator assembly is engaged to the second pump housing.

4. The vehicle of claim 1, wherein, in each of the first actuator assembly and the second actuator assembly, the spur gear reduction terminates with a sector gear engaged to the respective first control shaft or second control shaft.

5. The vehicle of claim 4, wherein in each of the first actuator assembly and the second actuator assembly, the sector gear is retained and aligned to receive the respective control shaft by a pocket formed in a sidewall of the gear chamber.

6. The vehicle of claim 1, wherein in each of the first actuator assembly and the second actuator assembly, the slip clutch comprises a clutch spring whose spring force establishes a threshold level, and the slip clutch couples the worm drive to the spur gear reduction when torque transmitted from the electric motor to the respective control shaft is below the threshold level, and uncouples the worm drive from the spur gear reduction when the transmitted torque is at or above the threshold level.

7. The vehicle of claim 6, wherein in each of the first actuator assembly and the second actuator assembly, the worm drive comprises a worm fixedly disposed about the motor output shaft and a worm gear disposed about a clutch support shaft, wherein the worm gear engages and drives a pinion gear disposed about the clutch support shaft.

8. The vehicle of claim 7, wherein each of the first actuator assembly and the second actuator assembly further comprises a cap mounted to the actuator housing to seal the electric motor in the motor chamber, and an electric connector passing through the cap to communicate with the electric motor, and a side housing mounted to the actuator housing to seal the gear chamber.

9. The vehicle of claim 1, wherein each of the first actuator assembly and the second actuator assembly further comprises an adapter disposed between the first end of the control shaft and the position sensor, wherein the adapter is capable of mechanically engaging the first end of the control shaft and the position sensor to communicate the rotational position of the control shaft to the drive controller.

10. The vehicle of claim 9, wherein in each of the first actuator assembly and the second actuator assembly, the adapter comprises a tang adapted to mechanically engage a rotatable portion of the position sensor.

11. The vehicle of claim 1, wherein the drive controller is connected to and receives input from a pair of control stick assemblies.

12. The vehicle of claim 1, comprising:
a cap mounted to the actuator housing to seal the electric motor in the motor chamber; and
an electric connector passing through the cap to communicate with the electric motor.

\* \* \* \* \*